United States Patent
Nukariya et al.

(10) Patent No.: US 10,437,494 B2
(45) Date of Patent: Oct. 8, 2019

(54) STORAGE CONTROL APPARATUS AND METHOD OF CONTROLLING A STORAGE APPARATUS BASED ON PREDICTION OF STORAGE ACCESS

(71) Applicant: FUJITSU LIMITED, Kawasaki-shi, Kanagawa (JP)

(72) Inventors: Atsushi Nukariya, Kawagoe (JP); Tsuyoshi Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/252,570

(22) Filed: Aug. 31, 2016

(65) Prior Publication Data

US 2017/0075612 A1    Mar. 16, 2017

(30) Foreign Application Priority Data

Sep. 14, 2015    (JP) .................................. 2015-180357

(51) Int. Cl.
    *G06F 3/06*    (2006.01)
(52) U.S. Cl.
    CPC ............ *G06F 3/0625* (2013.01); *G06F 3/067* (2013.01); *G06F 3/0634* (2013.01); (Continued)
(58) Field of Classification Search
    None
    See application file for complete search history.

(56) References Cited

U.S. PATENT DOCUMENTS

| 2009/0006877 A1* | 1/2009 | Lubbers ................ G06F 3/0625 |
| | | 713/323 |
| 2009/0055520 A1 | 2/2009 | Tabata et al. |

(Continued)

FOREIGN PATENT DOCUMENTS

| JP | 8-321123 | 12/1996 |
| JP | 9-282057 | 10/1997 |

(Continued)

OTHER PUBLICATIONS

Extended European Search Report dated Feb. 7, 2017 in related European Application No. 16186035.8.

(Continued)

*Primary Examiner* — Edward J Dudek, Jr.
*Assistant Examiner* — Ralph A Verderamo, III
(74) *Attorney, Agent, or Firm* — Staas & Halsey LLP

(57) ABSTRACT

A storage control apparatus configured to control a storage apparatus accessed by an information processing apparatus when the information processing apparatus executes a job, the storage control apparatus includes a memory configured to store plan information that indicates a plan in which the information processing apparatus executes the job and history information that indicates an history of access from the information processing apparatus to the storage apparatus when the information processing apparatus executes the job, and a processor coupled to the memory and configured to perform, based on the plan information and the history information, a prediction of whether the information processing apparatus accesses the storage apparatus in a certain time segment, and control power supply to the storage apparatus based on the prediction.

6 Claims, 17 Drawing Sheets

(52) U.S. Cl.
  CPC .......... *G06F 3/0653* (2013.01); *G06F 3/0659* (2013.01); *G06F 3/0673* (2013.01); *Y02D 10/154* (2018.01)

(56) References Cited

U.S. PATENT DOCUMENTS

| | | | |
|---|---|---|---|
| 2009/0083558 A1 | 3/2009 | Sugiki et al. | |
| 2009/0254702 A1 | 10/2009 | Kumano et al. | |
| 2011/0016336 A1* | 1/2011 | Mori .................... | G06F 3/0625 713/320 |
| 2013/0041875 A1* | 2/2013 | Kan ...................... | G06F 3/0625 707/705 |
| 2015/0052531 A1* | 2/2015 | Helak ................... | G06F 9/4856 718/102 |
| 2015/0095671 A1* | 4/2015 | Hu ........................ | G06F 1/3268 713/320 |

FOREIGN PATENT DOCUMENTS

| | | |
|---|---|---|
| JP | 2009-80603 | 4/2009 |
| JP | 2009-157571 | 7/2009 |

OTHER PUBLICATIONS

Japanese Office Action dated Feb. 26, 2019 in corresponding Japanese Application No. 2015-180357 (10 pages).

\* cited by examiner

FIG. 5

| USER ID | GROUP ID | JOB ID | USED NODE ID | USE TIME ZONE |
|---|---|---|---|---|
| 5 | 2 | 1 | 0-63, 128-255 | 13:00-15:00 |
| | | 35 | 0-31 | 15:00-16:00 |
| | | 102 | 64-127 | 13:00-15:00 |
| 5 | 1 | 2 | 0-255 | 19:00-22:00 |
| | | 30 | 0-31 | 17:00-18:00 |

| JOB ID | JOB ATTRIBUTE | DISK ID | ELAPSED TIME SEGMENT IN WHICH ACCESS IS MADE | ... |
|---|---|---|---|---|
| 1 | GID:2 UID:5 | 1 | 1 | |
| | | 5 | 7, 9, 10 | |
| | | 10 | 3, 5, 7 | |
| 2 | GID:1 UID:5 | 2 | 1, 2 | |
| | | 10 | 4, 7 | |

| ELAPSED TIME SEGMENT / JOB | 1 | 2 | 3 | 4 | 5 | 6 | 7 | 8 | 9 | 10 |
|---|---|---|---|---|---|---|---|---|---|---|
| 1 | (1) |  | (10) |  | (10) |  | (5) (10) |  | (5) | (5) |
| 2 | (2) | (2) |  | (10) |  |  | (10) |  |  |  |

| DISK ID | JOB ATTRIBUTE | ELAPSED TIME SEGMENT 1 | | ELAPSED TIME SEGMENT 2 | | ELAPSED TIME SEGMENT 3 | | ... |
|---|---|---|---|---|---|---|---|---|
| | | NUMBER OF ACCESSING JOBS | NUMBER OF ALL JOBS | NUMBER OF ACCESSING JOBS | NUMBER OF ALL JOBS | NUMBER OF ACCESSING JOBS | NUMBER OF ALL JOBS | |
| 1 | A (GID:2 UID:5) | 12 | 40 | 2 | 41 | 4 | 40 | |
| | B (GID:4 UID:6) | 1 | 1 | 2 | 35 | 2 | 25 | |
| | C (GID:2 UID:8) | 4 | 20 | 1 | 21 | 3 | 20 | |
| | D (GID:7 UID:3) | 5 | 10 | 4 | 12 | 6 | 14 | |
| 2 | E (GID:1 UID:5) | 2 | 5 | 1 | 37 | | | |
| | ... | | | | | | | |

| DISK ID | HDD STATE |
|---------|-----------|
| 1 | ON |
| 2 | ON |
| 3 | OFF |
| 4 | OFF |
| 5 | OFF |
| 6 | ON |
| ⋮ | |

STORAGE CONTROL APPARATUS AND METHOD OF CONTROLLING A STORAGE APPARATUS BASED ON PREDICTION OF STORAGE ACCESS

CROSS-REFERENCE TO RELATED APPLICATION

This application is based upon and claims the benefit of priority of the prior Japanese Patent Application No. 2015-180357, filed on Sep. 14, 2015, the entire contents of which are incorporated herein by reference.

FIELD

The embodiments discussed herein are related to a storage control apparatus and a method of controlling a storage apparatus.

BACKGROUND

In recent years, the amount of data that computer systems deal with has been increasing, and storage systems that hold data have been enlarged. Among the enlarged storage systems is a storage system which includes plural storage apparatuses and in which a storage control apparatus controls the plural storage apparatuses.

Incidentally, enlargement of the storage system leads to an increase in the power consumption amount of the system. Accordingly, there is a technique in which the storage control apparatus monitors accesses to the storage apparatuses, stops power supply to the storage apparatus in a case where no access is made to the storage apparatus for a certain time, and thereby reduces the power consumption amount. Further, there is a technique in which the storage control apparatus in advance generates an access history to the storage apparatus for each prescribed time zone and estimates an access pattern to the storage apparatus based on the access histories. The storage control apparatus performs power source control of the storage apparatus based on the estimated access pattern to the storage apparatus and may thereby reduce the power consumption more effectively. Examples of documents of related art are Japanese Laid-open Patent Publication No. 8-321123 and Japanese Laid-open Patent Publication No. 2009-157571.

SUMMARY

According to an aspect of the invention, a storage control apparatus configured to control a storage apparatus accessed by an information processing apparatus when the information processing apparatus executes a job, the storage control apparatus includes a memory configured to store plan information that indicates a plan in which the information processing apparatus executes the job and history information that indicates an history of access from the information processing apparatus to the storage apparatus when the information processing apparatus executes the job, and a processor coupled to the memory and configured to perform, based on the plan information and the history information, a prediction of whether the information processing apparatus accesses the storage apparatus in a certain time segment, and control power supply to the storage apparatus based on the prediction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram that illustrates one example of a job management table of the second embodiment;

FIG. 6 is a diagram that illustrates one example of an access log of the second embodiment;

FIG. 7 is a diagram that illustrates one example of an access pattern of the second embodiment;

FIG. 8 is a diagram that illustrates one example of an access tally table of the second embodiment;

FIG. 9 is a diagram that illustrates one example of a power source state table of the second embodiment;

DESCRIPTION OF EMBODIMENTS

In the related arts, even if the storage control apparatus performs power source control of the storage apparatus based on the access history to the storage apparatus in a prescribed time zone, the power consumption may not effectively be reduced.

An access pattern in which an access request is made from an external apparatus, such as a host or a server, to a storage apparatus is often different in accordance with the job executed by the external apparatus. Many hosts and servers simultaneously execute plural jobs. Further, job replacement in which a job in execution is finished and another job is started is appropriately performed. Thus, between when the access history is sampled and when the power source control is performed by the storage control apparatus, the job executed by the external apparatus may be different, and the access pattern from the external apparatus to the storage apparatus may be different. The storage control apparatus estimates the access pattern to the storage apparatus based on the access histories and performs the power source control of the storage apparatus based on the estimation results. Thus, in a case where the storage control apparatus performs power source control of the storage apparatus based on the access histories that are sampled in a state where the job executed by the external apparatus is different, the reduction in the power consumption of the storage apparatus may not effectively be performed.

Embodiments of the present disclosure will hereinafter be described with reference to drawings.

[First Embodiment]

Figure 1:
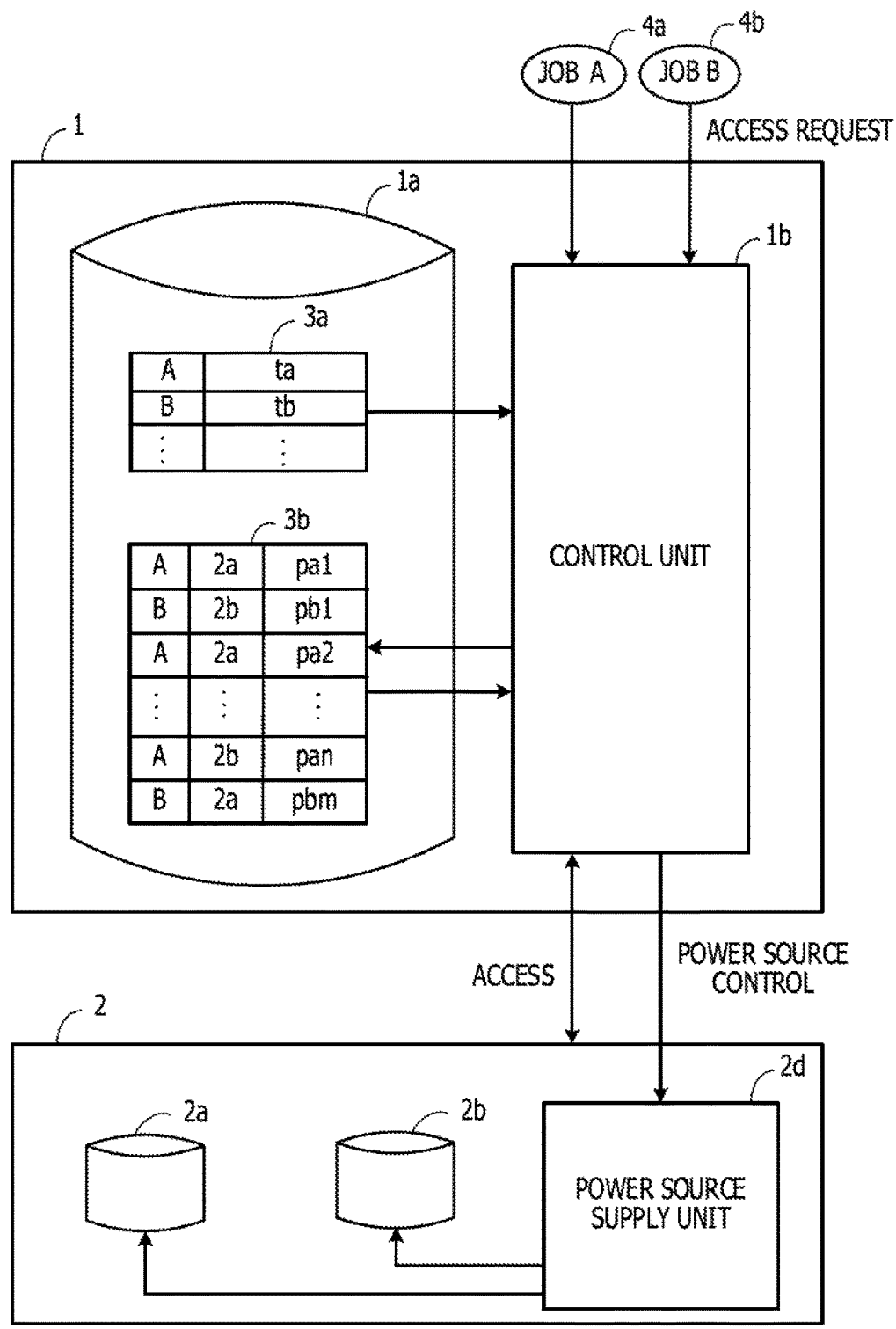
FIG. 1 is a diagram that illustrates a configuration of a storage control apparatus of a first embodiment.

FIG. 1 is a diagram that illustrates a configuration of a storage control apparatus of a first embodiment. A storage control apparatus 1 of the first embodiment receives access requests from external apparatuses (such as a host and a server, for example) that execute a job A (4a) and a job B (4b) and controls a storage apparatus 2 in accordance with the received access requests. The storage apparatus 2 has storage devices 2a and 2b and a power source supply unit 2d that supplies power source to the storage devices 2a and 2b. The storage devices 2a and 2b are a solid state drive (SSD), a hard disk drive (HDD), and so forth, for example. The power source supply unit 2d supplies power source to the storage devices 2a and 2b individually.

The storage control apparatus 1 has a storage unit 1a and a control unit 1b. The storage unit 1a stores plan information 3a and history information 3b. The storage unit 1a is a random access memory (RAM) or the like, for example.

The plan information 3a is information about execution plans of jobs that include planned execution times of the job A (4a) and the job B (4b). The plan information 3a is generated when a user or the external apparatuses perform execution reservations for the job A (4a) and the job B (4b) and is stored in the storage unit 1a. The job [A] planned to be executed, a use time zone [ta] in which the job A is planned to be executed, the job [B] planned to be executed, and a use time zone [tb] in which the job B is planned to be executed are registered in the plan information 3a illustrated in FIG. 1.

The history information 3b is information about an access history of accesses to each of the storage devices 2a and 2b, which are made by the job A (4a) and the job B (4b). The control unit 1b receives the access request from the job A (4a) and generates the access history when the control unit 1b accesses the storage devices 2a and 2b. The same applies to the job B (4b). The job at the time of access, the storage device to which the access is made, and the time segment in which the access is made are registered in the access history of the history information 3b illustrated in FIG. 1, while those are being associated with each other. The time segment is a time zone, which is obtained by dividing the elapsed time from the start of the job by the length (unit time) of a predetermined time segment. Numbers are sequentially provided to the time segments in accordance with the lapse of time, for example, such that the number 1 is provided to the time segment that corresponds to the start of the job. A situation in which the access is executed after how much time has elapsed after the start of the job may be known by the number of time segment that is registered in the access history. For example, the first row of the history information 3b records a fact that the job [A] accesses the storage device [2a] in a time segment [pa1]. The access histories generated in a prescribed period are accumulated in the history information 3b.

The control unit 1b performs access control to data that are arranged in the storage devices 2a and 2b of the storage apparatus 2 and power source control of the storage devices 2a and 2b.

In the access control, the control unit 1b receives the access requests from the external apparatuses that execute the job A (4a) and the job B (4b) and accesses storage areas of the storage devices 2a and 2b in accordance with the received access requests. Further, the control unit 1b generates the access history at each time when the control unit 1b performs an access process to the storage devices 2a and 2b and accumulates the access history in the history information 3b. The control unit 1b acquires the start times and unit time of the job A (4a) and the job B (4b) from the external apparatuses, divides the elapsed time of the job by the unit time, and thereby sets the time segment, for example. In the example of the history information 3b illustrated in FIG. 1, the control unit 1b sets the time segment in which one unit time elapses from the start of the job A (4a) as pa1 and sequentially sets pa2, pa3, . . . , pan (n is an integer of n≥1). Similarly, the control unit 1b divides the elapsed time from the start of the job B (4b) and sets pb1, pb2, . . . , pbm (m is an integer of m≥1). A common unit time to the job A (4a) and the job B (4b) are used for the time segment. Such history information 3b is recorded, and the control unit 1b may thereby estimate an access pattern of the job for each time segment.

In the power source control, the control unit 1b estimates accesses to the storage devices 2a and 2b by the job A (4a) and the job B (4b), which are planned to be executed in prescribed time segment, based on the plan information 3a and the history information 3b. The time segment is the time zone, which is obtained by dividing the elapsed time after the start of the storage control apparatus 1 or a system by a prescribed unit time, for example. The control unit 1b sets the time segment that corresponds to the starting time of the system as the number 1, sequentially provides numbers to the time segments, and thereby manages the time segments. The prescribed time segment indicates an arbitrary time segment after the start of the system. The length of the unit time that is used for the time segments is preferably the same as the unit time of the time segments that start from the start of the job. The control unit 1b estimates an access from the job that is planned to be executed in a target time segment from a past access pattern of the job based on the access histories accumulated in the history information 3b. The control unit 1b controls power source supply to the storage devices 2a and 2b based on the estimation results. The control unit 1b controls the power source supply to the storage devices 2a and 2b by providing an instruction to the power source supply unit 2d.

A description will be made about a power source control process of such a storage control apparatus 1 with the example illustrated in FIG. 1. It is assumed that the access histories in a case where the job A (4a) and the job B (4b) are executed one or more times are accumulated in the history information 3b. The access history from the time segment pa1 to pan of the job A (4a) and the access history from the time segment pb1 to pbm of the job B (4b) are accumulated in the history information 3b. The control unit 1b estimates the access to the storage device 2a by the job, which is planned to be executed in a prescribed time segment T. The control unit 1b identifies the job A (4a), which is planned to be executed in the prescribed time segment T, based on the plan information 3a and detects the time segment pai (1≤i≤n) of the job A (4a) in the prescribed time segment T. Accordingly, the control unit 1b estimates that as for the job A (4a) whose process is started from the start time in the plan information 3a, a process in the time segment pai in which the time segment pai has elapsed from the start is executed in the prescribed time segment T. The control unit 1b extracts the access history, in which the job A (4a) accesses the storage device 2a in the time segment pai, from the history information 3b. The control unit 1b estimates the access to the storage device 2a by the job A (4a), which is planned to be executed in the prescribed time segment T, based on the extracted access history. Further, the control unit 1b detects the time segment pbj (1≤j≤m), in which the job B (4b) is planned to be executed in the prescribed time segment T, and performs a similar process for the job B (4b). On an assumption that accesses are independent from each other job, the control unit 1b then estimates accesses to the storage devices 2a by all the jobs in the prescribed time segment T based on the respective estimation results for the job A (4a) and the job B (4b). The control unit 1b evaluates influences and so forth on the reduction effect of power consumption and performance of job processing in a case where the power supply is stopped, based on the estimation results of the accesses by all the jobs, and controls the power supply to the storage device 2a based on the evaluation results. In addition, the control unit 1b executes a similar process for the storage device 2b and controls the power supply to the storage device 2b. Further, for example, the jobs whose attributes such as a use field and a process content are the same are collected, estimation results are calculated for the jobs having the same attributes as a unit, and estimation about accesses by all the jobs may thereby be performed by using the estimation results.

In such a storage control apparatus 1, the control unit 1b generates the access history that includes the job which performs an access request, the storage device to which the access is made, and the time segment in a case where the access process is performed in response to the access request. The control unit 1b registers the access history in the history information 3b and stores the access history in the storage unit 1a. The control unit 1b estimates accesses to a prescribed storage device in a prescribed time segment with respect to each job, based on the accumulated history information 3b and the plan information 3a. The control unit 1b estimates accesses to the prescribed storage device by using the estimation results that are estimated with respect to each job and controls the power source supply to the storage device based on the estimation results.

As described above, the storage control apparatus 1 estimates accesses to the storage device by each job, which is planned to be executed in a prescribed time segment, based on the history information 3b in which the access histories of accesses by the jobs to each of the storage devices are accumulated and the plan information 3a of the jobs. This enables an access estimation of accesses to the storage devices to be more accurately performed based on the access pattern of the job, which is planned to be executed in a prescribed time segment, and enables effective reduction in the power consumption of the storage apparatus.

[Second Embodiment]

Next, a description will be made about a computer system of a second embodiment. A description will first be made about a configuration of the second embodiment, and a description will next be made about an access process that corresponds to the access request to the storage apparatus and a power reduction process for reducing the power consumption of the storage apparatus.

(1) Configuration

Figure 2:
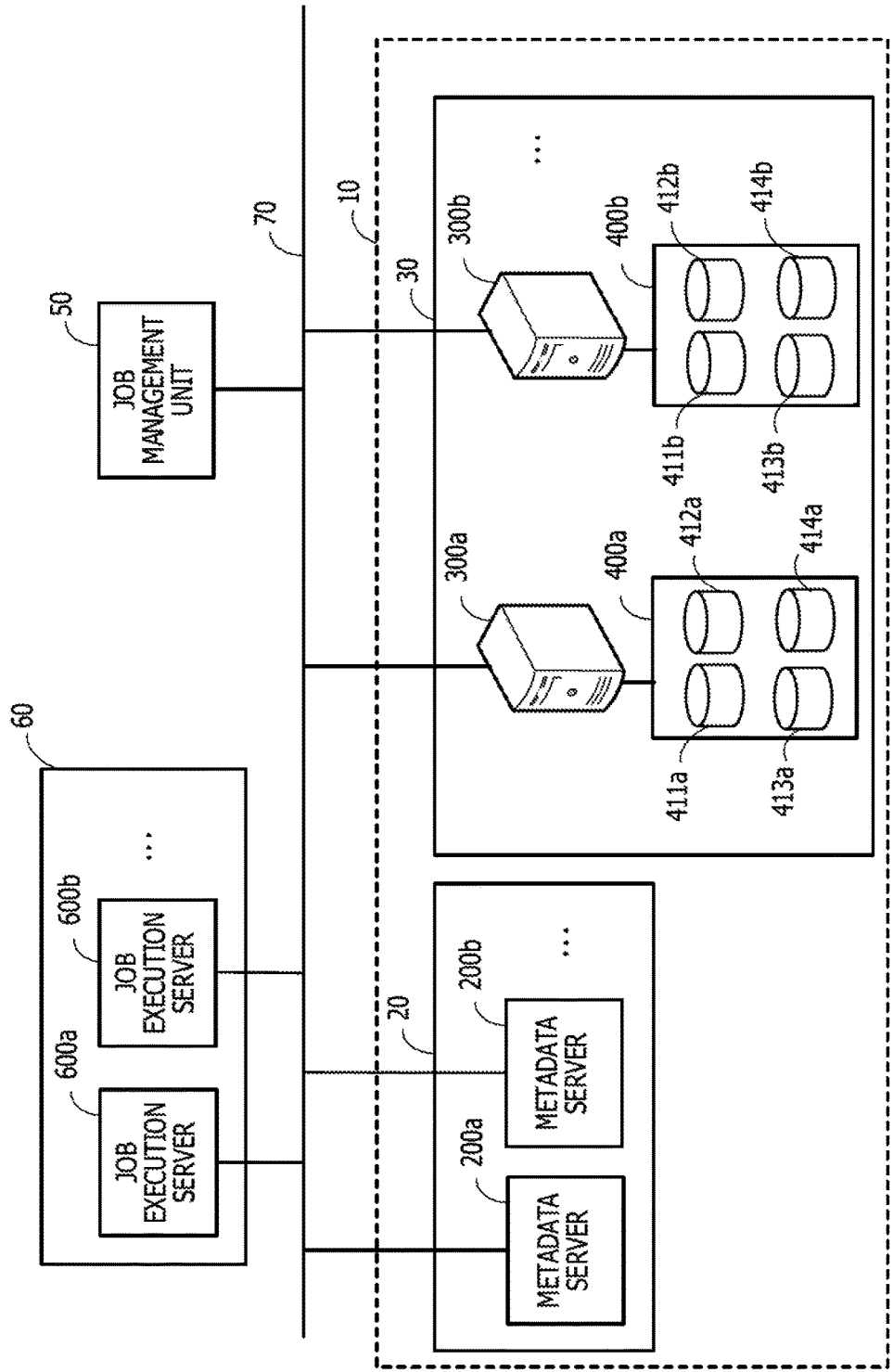
FIG. 2 is a diagram that illustrates one example of a configuration of a computer system of a second embodiment.

FIG. 2 is a diagram that illustrates one example of a configuration of the computer system of the second embodiment.

In the computer system of the second embodiment, a metadata server group 20, a data server group 30, a job management server 50, and a job execution server group 60 are coupled together via a network (channel) 70. The metadata server group 20 and the data server group 30 are included in a file system 10, and the job execution server group 60 accesses the file system 10 when a job is executed.

The metadata server group 20 has plural metadata servers 200a and 200b. The metadata servers 200a and 200b have disk information, in which a data server and HDD in which file data are stored are registered, and perform access management and power source management. The metadata servers 200a and 200b receive requests from job execution servers 600a and 600b and provide access instructions to data servers 300a and 300b that manage storage apparatuses 400a and 400b based on the disk information. Further, the metadata server 200a and 200b perform power source management of HDDs of the data server group 30. The metadata server group 20 is one embodiment of the storage control apparatus 1 of FIG. 1.

The data server group 30 has the plural data servers 300a and 300b. The data servers 300a and 300b are respectively coupled with the storage apparatuses 400a and 400b and perform access control of accesses to the storage apparatuses 400a and 400b and power source control in accordance with instructions from the metadata servers 200a and 200b. Plural HDDs 411a, 412a, 413a, and 414a are mounted on the storage apparatus 400a. Similarly, plural HDDs 411b, 412b, 413b, and 414b are mounted on the storage apparatus 400b. Each of the storage apparatuses 400a and 400b may be redundant arrays of inexpensive disks (RAID) system that uses a built-in HDD. The file data that are managed by the file system 10 are stored in a storage area of each of the HDDs. Each of the HDDs is managed by using a disk ID that is uniquely allocated thereto. The data server group 30 is one embodiment of the storage apparatus 2 of FIG. 1. In the description made below, in a case where a description does not have to be made by specifying the HDD, the HDD mounted on the storage apparatuses 400a and 400b will be referred to as disk 410.

The job management server 50 schedules execution of jobs based on a job management table in which information about execution plans of jobs are registered.

The job execution server group 60 has the plural job execution servers 600a and 600b. The job execution servers 600a and 600b execute jobs that are allocated by the job management server 50. In execution of a job, the job execution servers 600a and 600b perform access requests to the metadata servers 200a and 200b when the job execution servers 600a and 600b access a file that is retained by the file system 10.

The job management server 50, the metadata servers 200a and 200b, the data servers 300a and 300b, and the job execution servers 600a and 600b operate in accordance with system time in which whole the system is synchronized. Accordingly, the system times that are counted by the servers correspond with each other among the servers.

Figure 3:
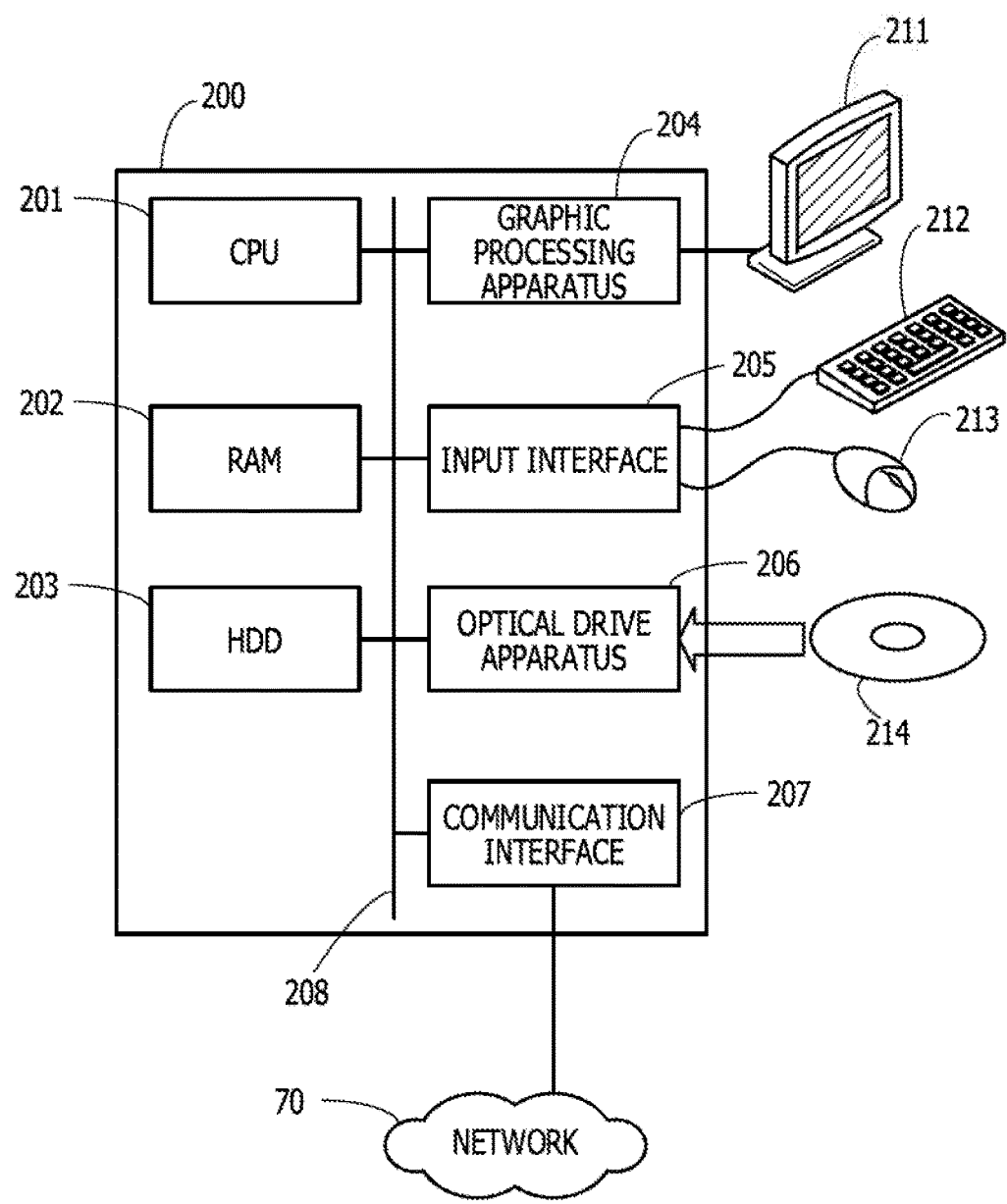
FIG. 3 is a diagram that illustrates one example of a hardware configuration of a metadata server of the second embodiment.

A description will next be made about a hardware configuration of the metadata server of the second embodiment with reference to FIG. 3. FIG. 3 is a diagram that illustrates one example of the hardware configuration of the metadata server of the second embodiment. In the description made below, the metadata server will be referred to as metadata server 200 in a case where the metadata server 200a or 200b does not have to be specified. The same applies to a data server 300, a storage apparatus 400, and a job execution server 600.

Whole an apparatus of the metadata server 200 is controlled by a central processing unit (CPU) 201. The CPU 201 is coupled with a RAM 202 and plural peripheral instruments via a bus 208.

The RAM 202 is used as a main storage apparatus of the metadata server 200. The RAM 202 temporarily stores at least a portion of programs of an operating system (OS) and application programs to be executed by the CPU 201. Further, the RAM 202 stores various data that are used for processes by the CPU 201.

The peripheral instruments coupled with the bus 208 are an HDD 203, a graphic processing apparatus 204, an input interface 205, an optical drive apparatus 206, and a communication interface 207.

The HDD 203 magnetically writes data in and reads out data from a built-in disk. The HDD 203 is used as a secondary storage apparatus of the metadata server 200. The HDD 203 stores programs of the OS, the application programs, and various data. As the secondary storage apparatus, a semiconductor storage apparatus such as a flash memory may be used.

The graphic processing apparatus 204 is coupled with a monitor 211. The graphic processing apparatus 204 displays an image on a screen of the monitor 211 in accordance with an order from the CPU 201. Examples of the monitor 211 may include a display apparatus that uses a cathode ray tube (CRT), a liquid crystal display apparatus, and so forth.

The input interface 205 is coupled with a keyboard 212 and a mouse 213. The input interface 205 transmits signals transmitted from the keyboard 212 and the mouse 213 to the CPU 201. The mouse 213 is one example of a pointing device, and another pointing device may be used. Examples of another pointing device may include a touch panel, a tablet, a touch pad, a trackball, and so forth.

The optical drive apparatus 206 reads data recorded on an optical disk 214 by using laser light or the like. The optical disk 214 is a portable recording medium in which data are recorded such that the data are readable by reflection of light. Examples of the optical disk 214 may include a digital versatile disc (DVD), a DVD-RAM, a compact disc read only memory (CD-ROM), a CD-recordable (R)/rewritable (RW), and so forth.

The communication interface 207 is coupled with the network 70. The communication interface 207 performs transmission and reception of data with another computer or communication instrument via the network 70.

The above-described hardware configuration enables processing functions of this embodiment to be realized. FIG. 3 illustrates the hardware configuration of the metadata server 200. The data server 300, the job management server 50, and the job execution server 600 have similar hardware configurations.

Figure 4:
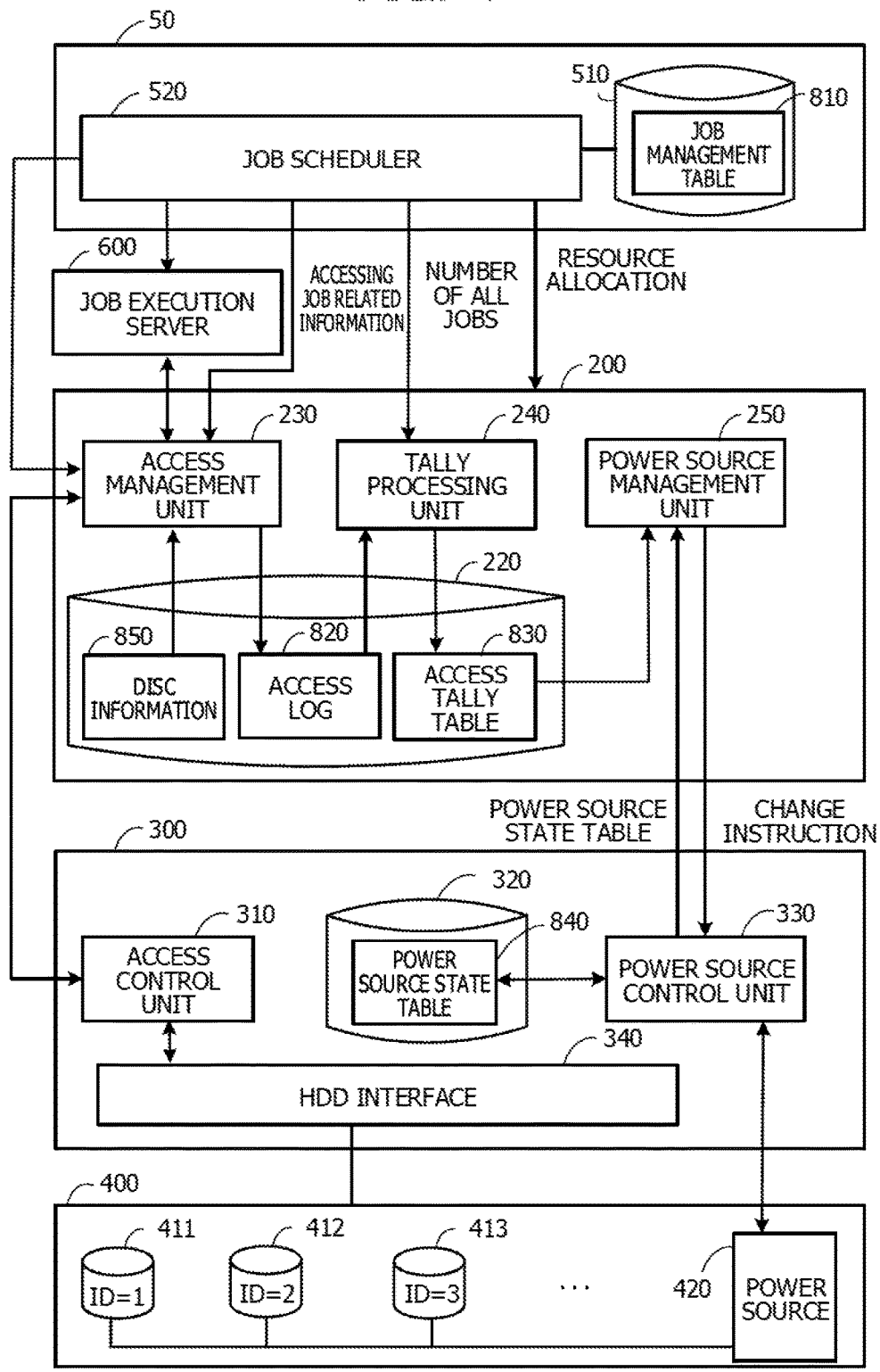
FIG. 4 is a block diagram that illustrates one example of a configuration of a processing function of each server of the second embodiment.

A description will next be made about configurations of processing functions of the servers, which are the job management server 50, the metadata server 200, the data server 300, and the job execution server 600, with reference to FIG. 4. FIG. 4 is a block diagram that illustrates one example of the configuration of the processing function of each server of the second embodiment.

The job management server 50 has a storage unit 510 and a job scheduler 520. The storage unit 510 is a RAM or the like, for example, and stores information related to execution of jobs, which includes a job management table 810. The job management table 810 is information in which execution of jobs is scheduled, is generated by the job scheduler 520, and is stored in the storage unit 510. For example, a job ID that is uniquely allocated to each of the jobs, a node ID of the job execution server 600 that executes a job, an operation time zone of a job, and so forth are registered in the job management table 810. The node ID is identification information that is uniquely allocated to the job execution server 600.

The job scheduler 520 receives a request from a user or another server, schedules a job, and causes the job management table 810 to reflect a scheduling result. When the job scheduler 520 receives an execution request of a job, the job scheduler 520 schedules execution of the job based on usable resources such as the job execution server group 60, the metadata server group 20, and the data server group 30, and causes the job management table 810 to reflect the schedule. Further, the job scheduler 520 manages the start and the finish of a job based on the job management table 810. The job scheduler 520 allocates desired resources to the job, allocates the job to the job execution server 600, and instructs the job execution server 600 to start the job at a starting time of the job that is registered in the job management table 810. Further, the job scheduler 520 instructs the job execution server 600 to finish the job at the finish time of the job that is registered in the job management table 810. The job scheduler 520 stores job execution information about an execution state of job, which includes the start time when the job is started, in the storage unit 510 in the period in which the job is operated. The job scheduler 520 may manage the job execution information as additional information of the job management table 810 together with the job management table 810. In addition, the job scheduler 520 provides information about jobs, which includes the job management table 810 and the job execution information, in response to a request from the metadata server 200.

The job execution server 600 executes the allocated job in accordance with an instruction from the job management server 50. The job execution server 600 transmits an access request to the metadata server 200 when the job execution server 600 accesses the file system 10 in execution of a job.

The metadata server 200 has a storage unit 220, an access management unit 230, a tally processing unit 240, a power source management unit 250 and manages the data server 300. The metadata server 200 performs a process by using the time segment, which is obtained by dividing the elapsed time after the starting time of the metadata server 200 or the system by a prescribed unit time, as a reference. In the description made below, the time segments, to which numbers are sequentially provided at each time when the unit time elapses from the starting time of the metadata server 200 or the starting time of the system as the start point, will simply be referred to as time segment. Meanwhile, with respect to each job, the time segment that corresponds to the start of the job is set as the number 1, and the time segment to which numbers are sequentially provided to the finish of the job are set as elapsed time segments. Further, the unit time is appropriately set by the user. For example, the user is capable of recognizing the access pattern in accordance with the access frequency of the job and sets the unit time by assuming the time from which an effect of power reduction by the power source control is expected. In the second embodiment, the unit time is set as five minutes as one example.

The storage unit 220 is formed in a storage area of the RAM 202, for example, and stores an access log 820, an access tally table 830, and disk information 850. The access log 820 is information that individually records the access process performed by the access management unit 230 with respect to each access. The access tally table 830 includes the number of jobs that access a prescribed disk 410 in the elapsed time segments, the number which is tallied by the tally processing unit 240 based on the access log 820 with respect to each job attribute, and includes the number of all executed jobs. The disk information 850 is information which is related to files managed by the file system 10 and in which information that identifies the data server 300 in which the file data are present, information that identifies the disk 410 in which the file data are present, and information in which file sizes and so forth are registered. In a case where the data server 300 may be identified by the information that identifies the disk 410 in which the file data are present, the information that identifies the data server 300 may not be used.

The access management unit 230 receives an access request from the job execution server 600 and instructs the corresponding data servers 300 to execute the access request based on the disk information 850. Further, the access management unit 230 generates log data about the access process in this case and registers the log data in the access log 820. The access management unit 230 registers the log data generated with respect to each access in the access log 820 and accumulates the log data. The access management unit 230 performs an inquiry to the job management server 50 by specifying the job execution server 600 that performs the access request and acquires accessing job related information that includes the job which performs the access request, the start time of the job, and the unit time of the elapsed time segments, for example. In a case where the unit time is once acquired, the unit time may not be acquired again. The access management unit 230 calculates the present elapsed time segment in which the access is performed based on the acquired start time of the job, present time, and unit time of the elapsed time segments. The access management unit 230 generates log data that includes the disk 410 which is the access destination based on the disk information 850, in addition to the job which requests the access and the elapsed time segment in which the access is performed, which are obtained as described above, and registers the log data in the access log 820. The log data is one embodiment of the access history of the first embodiment, and the access log 820 is one embodiment of the history information 3b of the first embodiment.

The tally processing unit 240 periodically performs a tally process of the access log 820 at prescribed timings and generates the access tally table 830. The tally processing unit 240 analyzes the access log 820, for example, and thereby tallies the number of accessing jobs that represents accesses to a target disk 410 by the jobs which have the same job attribute with respect to each of the elapsed time segments. Further, the tally processing unit 240 acquires the number of all the jobs that are executed in the elapsed time segment in which the number of accessing jobs is tallied and that have the same job attribute from the job management server 50 and registers the number of all the jobs in the access tally table 830, while associating the number of all the jobs with the number of accessing jobs.

The power source management unit 250 acquires a power source state table 840 that indicates power source states of HDDs 411, 412, and 413 of the storage apparatus 400 from the data server 300. Information that indicates whether power sources of the HDDs 411, 412, and 413 are turned on or off is registered in the power source state table 840. The power source management unit 250 estimates accesses to the HDDs 411, 412, and 413 in a prescribed time segment based on the access tally table 830. The power source management unit 250 controls the power source supply to the HDDs 411, 412, and 413 based on power source supply states for the HDDs 411, 412, and 413 based on the power source state table 840 and estimation results. The power source management unit 250 calculates access probabilities that accesses are performed to the HDDs 411, 412, and 413 in a prescribed time segment, for example, and thereby evaluates the power consumption amount in a case of turning on the power source and in a case of turning off the power source based on the access probabilities. The power source management unit 250 selects the power source states that may reduce the power consumption amount more based on evaluation results. The power source management unit 250 then outputs an instruction for controlling the power source states to the data server 300 in a case where the selected power source states are different from the present power source states based on the power source state table 840.

The data server 300 has an access control unit 310, a storage unit 320, a power source control unit 330, and an HDD interface 340 and is coupled with the storage apparatus 400 via the HDD interface 340.

The access control unit 310 acquires an execution instruction of an access request from the access management unit 230 of the metadata server 200 and writes data in or reads data from storage areas of the HDDs 411, 412, and 413 that store target file data.

The storage unit 320 is a RAM or the like, for example, and stores the power source state table 840. The power source state table 840 is information that indicates whether a power source 420 turns on or off each of the power sources of the HDDs 411, 412, and 413. The power source control unit 330 acquires the states from the power source 420 and thereby stores initial values of the power source state table 840 in the storage unit 320.

The power source control unit 330 notifies the power source management unit 250 of the power source state table 840 in response to a request from the power source management unit 250 of the metadata server 200. Further, the power source control unit 330 receives a power source control instruction from the power source management unit 250 and instructs the power source 420 to stop or start the power source supply to the disk 410. Further, in a case where the power source state for the disk 410 is changed in accordance with the instruction from the power source management unit 250, the power source state table 840 is updated in accordance with the change.

The storage apparatus 400 has the plural HDDs 411, 412, and 413 and the power source 420 that supplies power source to the HDDs 411, 412, and 413 individually.

The HDDs 411, 412, and 413 have respective storage areas that retain file data. The HDD 411 is provided with disk ID=1, the HDD 412 is provided with disk ID=2, and the HDD 413 is provided with disk ID=3. The access control unit 310 manages the HDDs 411, 412, and 413 by the disk IDs.

The power source 420 is coupled with the power source control unit 330 of the data server 300 and controls turning on and off of the power sources to be supplied to the HDDs 411, 412, and 413 in accordance with an instruction from the power source control unit 330. Further, the power source 420 retains the power source states of the HDDs 411, 412, and 413 and notifies the power source states in response to a request from the power source control unit 330.

Next, descriptions will sequentially be made about the job management table 810, the access log 820, the access tally table 830, and the power source state table 840 of the second embodiment.

FIG. 5 is a diagram that illustrates one example of the job management table of the second embodiment.

A job management table 810a has information items of user ID, group ID, job ID, used node ID, and use time zone as management information about the start and the finish of a job.

The user ID is a number that is uniquely allocated to each user. The group ID is a number that is uniquely allocated to a group in which an affiliation, business contents, or the like is common to users. The combination of the user ID and the group ID is set as the job attribute. However, the job attribute is not limited to this, but other features of a job may be included in the job attribute, for example. In the second embodiment, it is assumed that the jobs that have the same job attribute have similar access patterns in a case where the job execution server 600 executes the jobs.

The job ID is a number that is uniquely allocated to each job.

The used node ID is information that identifies the job execution server 600 which is used by the job management server 50 for job allocation. A node ID is a number that is uniquely allocated to each of the job execution servers 600 included in the job execution server group 60. In a case where the job management server 50 is instructed by the user to execute a job and schedules the execution, the job management server 50 allocates the job to the job execution server 600 based on a resource use situation.

The use time zone is a time zone in which the job execution server 600 executes the allocated job.

FIG. 6 is a diagram that illustrates one example of an access log of the second embodiment.

An access log 820a has information items of job ID, job attribute, disk ID, and elapsed time segment in which access is made. The job ID is identification information of a job that performs an access request. The job attribute is a specific attribute of the job that is registered in the job ID and is the group ID (GID) and the user ID (UID) in the example of FIG. 6. The disk ID is identification information of the disk 410 to which an access is made. The elapsed time segment in which access is made is the elapsed time segment in which the access management unit 230 instructs the data server 300 to make an access. As described above, the start points of time count of the elapsed time segments are different among the job attributes. For example, as illustrated in the job management table 810a of FIG. 5, a job [1] is started at 13:00, and a job [2] is started at 19:00. In a case where the unit time of the elapsed time segment is five minutes, an elapsed time segment 1 of the job [1] corresponds to 13:00-13:05. Similarly, the elapsed time segment 1 of the job [2] corresponds to 19:00-19:05.

The access log 820a indicates log data that are obtained when the job execution server 600 executes each of the job whose job ID is [1] and the job whose job ID is [2] one or more times.

FIG. 7 is a diagram that illustrates one example of the access pattern of the second embodiment. An access pattern 820b is a diagram in which the disk IDs of HDDs which are accessed by the job [1] and the job [2] in the elapsed time segments are arranged in the time series in a case where the log data of the access log 820a are sampled. The numbers in ( ) indicate the disk IDs of the HDDs. For example, the job [1] accesses (1) in the elapsed time segment 1, (10) in the elapsed time segment 3, (10) in the elapsed time segment 5, (5) and (10) in the elapsed time segment 7, and (5) in the elapsed time segments 9 and 10. Meanwhile, the job [2] accesses (2) in the elapsed time segments 1 and 2 and (10) in the elapsed time segments 4 and 7. As illustrated in FIG. 7, the access pattern in which the job accesses the disk 410 after the start is characteristic of each job.

The access management unit 230 of the second embodiment samples the log data about accesses by jobs with respect to each of the disks 410, accumulates the log data in the access log 820a, and may thereby analyze the access pattern of each job.

FIG. 8 is a diagram that illustrates one example of an access tally table of the second embodiment. The access tally table 830a is information in which the access logs 820a illustrated in FIG. 6 are tallied.

The access tally table 830a has information items of disk ID, job attribute, and tally values in each of the elapsed time segments. The disk IDs and the job attributes are the same as the access log 820a illustrated in FIG. 6. In the description made below, for simplification of the description, the different job attributes will be referred to as A (GID: 2, UID: 5), B (GID: 4, UID: 6), C (GID: 2, UID: 8), D (GID: 7, UID: 3), and E (GID: 1, UID: 5).

The tally values of each of the elapsed time segments have two items, number of accessing jobs and all jobs. The number of accessing jobs is the number of jobs that access prescribed disks 410 and have prescribed job attributes in an elapsed time segment N (N is an integer of N≥1). The tally processing unit 240 tallies the number of jobs that access the prescribed disks 410 in the elapsed time segment N of the access log 820a illustrated in FIG. 6 and thereby calculates the number of accessing jobs, for example. In a case where the one job accesses the same disk 410 plural times in the elapsed time segment, the number of accessing jobs is counted as one. The number of all jobs is the number of all the jobs that are executed in the elapsed time segment N in which the number of the accessing jobs is tallied and that have the same job attribute. The number of all jobs includes jobs that do not access the disk 410. For example, the first row of FIG. 8 indicates that the number of all the jobs having the same job attribute, which are executed in the elapsed time segment 1 of the jobs which have a job attribute A, is [40] and indicates that the number of jobs that access the disk of the disk ID [1] among all the jobs is [12].

The tally processing unit 240 acquires the number of all jobs from the job management server 50 when the tally processing unit 240 performs a tally process. The tally processing unit 240 specifies the job attribute and the elapsed time segment to the job management server 50, requests the total number of concerned jobs that are processed in the elapsed time segment, and acquires the number of all jobs that is tallied by the job management server 50.

The number of accessing jobs and the number of all jobs that are tallied with respect to each of the elapsed time segments are cumulative values obtained after the metadata server 200 starts acquiring the access log 820. The job management server 50 has the jobs repeatedly executed, the jobs having the same job attribute, based on the job management table 810. The tally processing unit 240 analyzes the access log 820 of the jobs having the same job attribute, which are started at different start times, tallies all the concerned log data, and calculates the cumulative value. The tally processing unit 240 tallies the number of accessing jobs that access the prescribed disk 410 with respect to each of the elapsed time segments based on the access log 820a, for example. The tally processing unit 240 adds the tallied number of accessing jobs to the value of the corresponding section of the number of accessing jobs in the access tally table 830*a* and updates the value of the section of the number of accessing jobs. Similarly for the number of all jobs, the tally processing unit 240 adds the number of all jobs that are acquired from the job management server 50 to the value of the corresponding section of the all jobs and updates the value of the section of the all jobs.

The tallied numbers of accessing jobs and all jobs may be used to calculate an access ratio in which the jobs having a prescribed job attribute access a target HDD in a prescribed time segment. As described above, the number of jobs that make accesses and the number of all jobs performed after the operation of this system is started are accumulated, and the calculated access ratios may thereby be leveled.

FIG. 9 is a diagram that illustrates one example of a power source state table of the second embodiment. A power source state table 840*a* has items of disk ID and HDD state. The disk ID is a number that is uniquely provided to the HDD of the storage apparatus 400. The HDD state is information that indicates whether the power source of the HDD identified by the disk ID is in a tuned-on state or a turned-off state.

The power source control unit 330 of the data server 300 acquires the power source states from the power source 420 and sets the power source state table 840*a* when the data server 300 is started. Thereafter, the power source control unit 330 changes the power source state of the disk 410 in accordance with an instruction to change the power source state from the power source management unit 250 of the metadata server 200 and rewrites the power source state table 840*a*.

In such a configuration, the storage control of the second embodiment is performed.

(2) Access Process

Figure 10:
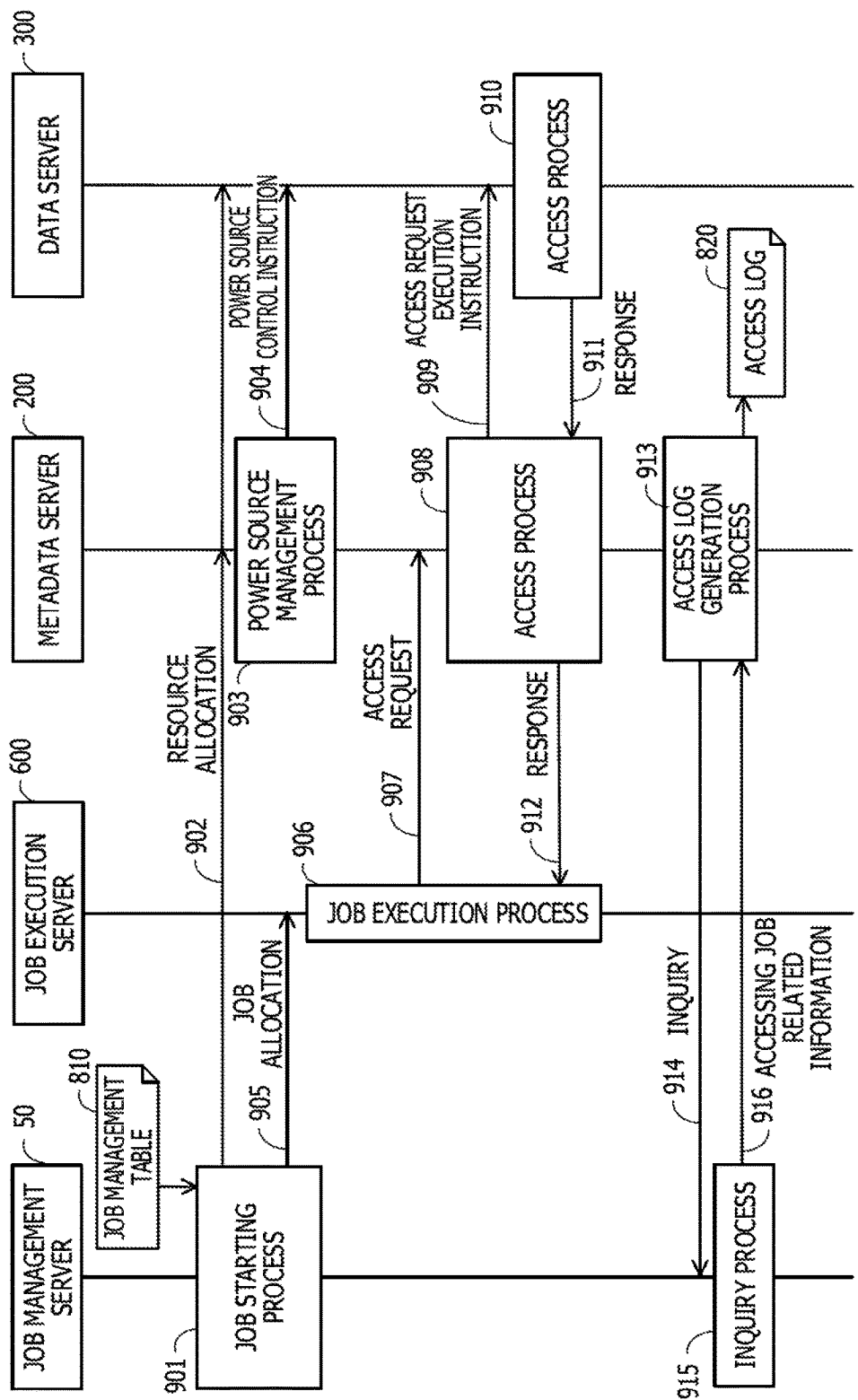
FIG. 10 is a diagram that illustrates a process in a case where a job is started and an access request by the job is made in the second embodiment.

A description will be made about an access process of the second embodiment with reference to FIG. 10. FIG. 10 is a diagram that illustrates a process in a case where a job is started and an access request by the job is made in the second embodiment. Here, the flow of whole the process will be described.

The job management server 50 starts a job starting process 901 at each time when the job execution server 600 completes execution of a job, for example. In the job starting process 901, a process to start the job whose planned start time has passed is performed based on the job management table 810. In a case where a job to be started is present, the job management server 50 instructs the file system 10 (the metadata server 200 and the data server 300) on resource allocation 902 for allocation of resources of the file system 10 that is desired by the job. After transmitting the resource allocation 902, the job management server 50 transmits job allocation 905 for allocation of jobs to the job execution server 600 and instructs the job execution server 600 to start the job. Details of the job starting process 901 by the job management server 50 will be described later with reference to FIG. 11.

The metadata server 200 and the data server 300 allots the file data used by the jobs to the disks 410 in accordance with requests by the resource allocation 902. Here, the metadata server 200 registers information about which disks 410 the file data are allocated to in the disk information 850. Further, the metadata server 200 performs a power source management process 903 because a new job is started in the job execution server 600. Then, the metadata server 200 outputs a power source control instruction 904 that controls the power source states of the disks 410 to the data server 300 in accordance with a determination result by the power source management process 903. Details of the power source management process 903 will be described later with reference to FIG. 14.

The job execution server 600 to which the job is allocated starts a job execution process 906. In the job execution process 906, the job execution server 600 transmits an access request 907 to the metadata server 200 by specifying the file when an access to the file is desired. The metadata server 200 receives the access request 907 and starts an access process 908. In the access process 908, the metadata server 200 transmits an access request execution instruction 909 to the data server 300 that corresponds to the access request 907 based on the disk information 850. When the data server 300 receives the access request execution instruction 909, the data server 300 executes an access process 910 for accessing a target HDD and transmits a response 911 to the metadata server 200. The metadata server 200 receives the response 911 from the data server 300 and transmits a response 912 to the job execution server 600. The access process by the job execution server 600 thereby finishes.

After the access process 908 finishes, the metadata server 200 executes an access log generation process 913 for generating the access log about the executed access. In the access log generation process 913, the metadata server 200 uses the node ID of the job execution server 600 that transmits the access request 907 and thereby transmits an inquiry 914 about the accessing job related information about the job that accesses the job management server 50. The job management server 50 receives the inquiry 914 and performs an inquiry process 915 for extracting the information about the job of the node ID, for which the inquiry is received, based on the job management table 810 and the job execution information in which the execution situation of the job is registered. In the inquiry process 915, the job management server 50 creates accessing job related information 916 that includes the job ID of the node ID for which the inquiry is received, the job attribute, and the start time of the job and transmits the accessing job related information 916 to the metadata server 200. The metadata server 200 receives the accessing job related information 916 and thereby acquires the job ID, the job attribute, and the job start time of the job related to the present access request 907. The metadata server 200 calculates the elapsed time segment that corresponds to the access request 907 from the start time of the job, the system time in the metadata server 200, and the unit time of the elapsed time segments. For example, the metadata server 200 sets the start time of the job as Ts, the system time as Tsys, and the unit time of the elapsed time segments as ΔT and calculates an elapsed time segment t by the following equation (1).

$$t=(Tsys-Ts)\div\Delta T \qquad (1)$$

Further, the metadata server 200 identifies the disk ID that corresponds to the access request 907 based on the disk information 850. As described above, the metadata server 200 identifies the job ID, the job attribute, the disk ID, and the elapsed time segment in which the access is made, which correspond to the access request 907. The metadata server 200 additionally registers the calculated time segment t in the section of elapsed time segment in which access is made, for which the items of job ID, job attribute, and disk ID match those of the access log 820*a*, for example. In a case where no item matches, a new record is created.

The above-described process from the access request 907 by the job execution server 600 to the access log generation process 913 by the metadata server 200 is executed at each time when the job execution server 600 has the access request 907 in the job execution process 906.

Figure 11:
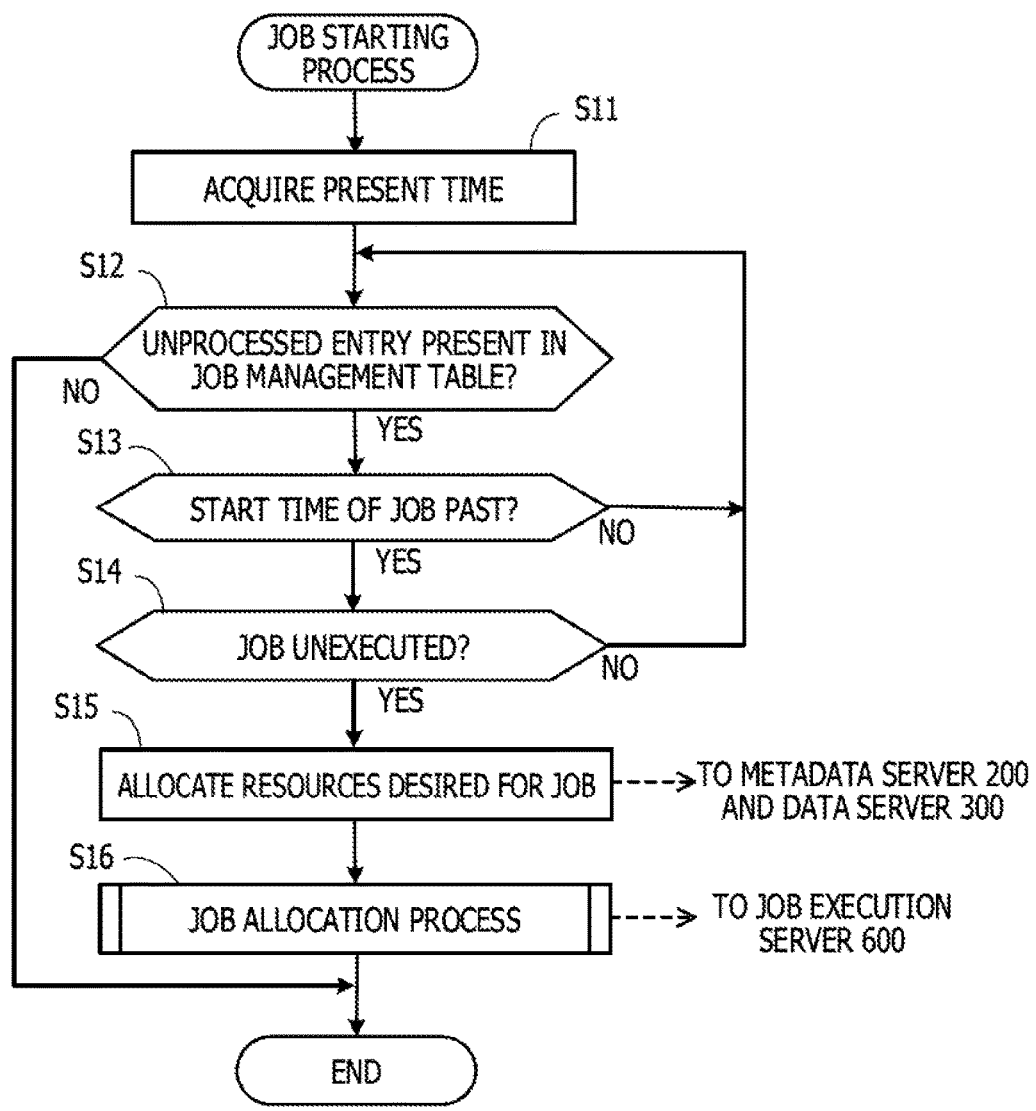
FIG. 11 is a diagram that illustrates a flowchart of a job starting process of the second embodiment.

A description will next be made about the job starting process 901 by the job management server 50. FIG. 11 is a diagram that illustrates a flowchart of a job starting process of the second embodiment.

The job management server 50 starts the job starting process 901 at each time when execution of a job is completed or in a prescribed cycle, for example, and executes the following process procedure.

[Step S11] The job management server 50 acquires the present time. The present time is the system time Tsys in which whole the system is synchronized.

[Step S12] The job management server 50 reads out the job management table 810 and determines whether an unprocessed entry in which the job is not started is present in the job management table 810. The job management server 50 moves the process to step S13 in a case where the unprocessed entry is present but finishes the process in a case where no unprocessed entry is present.

[Step S13] The job management server 50 selects one unprocessed entry in a case where unprocessed entries are present in the job management table 810. The job management server 50 investigates the use time zone of a target job registered in the selected entry and compares the start time of the target job with the present time. In a case where the present time is later than the start time of the target job, the job management server 50 moves the process to step S14 but moves the process to step S12 in a case where the start time has not yet passed.

[Step S14] The job management server 50 determines whether or not the job is unexecuted based on the job execution information in a case where the start time of the target job has passed. The job management server 50 moves the process to step S15 in a case where the job is unexecuted but moves the process to step S12 in a case where the job is not unexecuted.

[Step S15] In a case where the target job is unexecuted, the job management server 50 instructs the metadata server 200 and the data server 300 in the file system 10 to allocate desired resources to the target job. Accordingly, the desired resources for the execution of the job are secured in the file system 10.

[Step S16] The job management server 50 performs a job allocation process for allocating the target job to the job execution server 600. The job management server 50 allocates the job to the job execution server 600 to which the target job is allocated based on the job management table 810 and instructs the job execution server 600 to start the job. After the job allocation process, the job management server 50 finishes the process.

Figure 12:
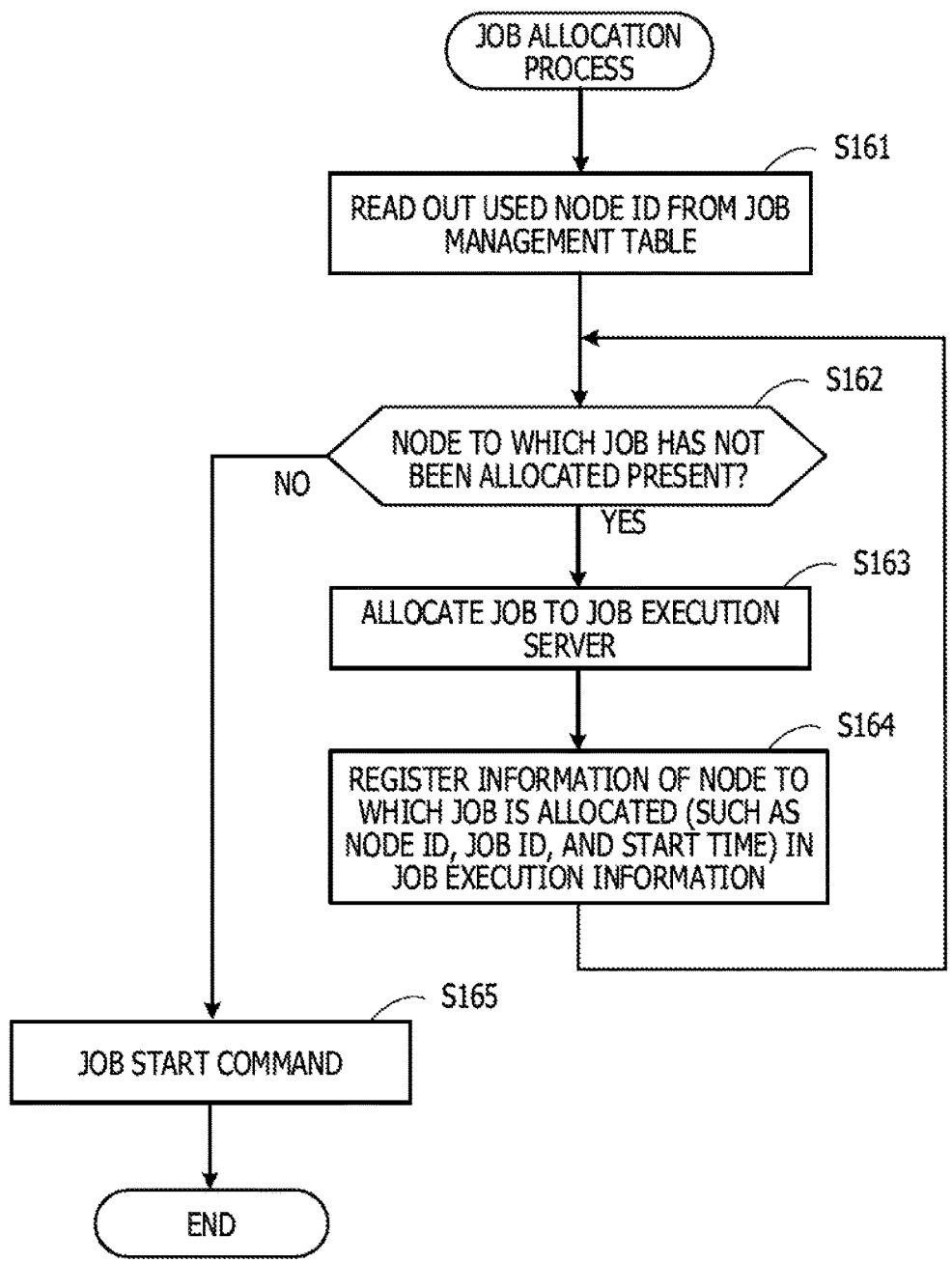
FIG. 12 is a diagram that illustrates a flowchart of a job allocation process of the second embodiment.

A description will be made about the job allocation process by the job management server 50. FIG. 12 is a diagram that illustrates a flowchart of the job allocation process of the second embodiment.

[Step S161] The job management server 50 reads out the node ID of the job execution server 600 that is used for execution of the job from the job management table 810. In the example of the job management table 810a illustrated in FIG. 5, the job execution servers 600 with the used node IDs of [0-63, 128-255] are registered for the job with job ID of [1].

[Step S162] The job management server 50 determines whether or not a node (the job execution server 600) to which a job is not yet allocated is present. For example, in the above example, the job management server 50 determines whether the job execution server 600 to which a job is not yet allocated is present among the job execution servers 600 with the node IDs of 0 to 63 and 128 to 255. The job management server 50 performs a determination by referring to the job execution information that records information about execution situations of jobs, for example. The job management server 50 moves the process to step S163 in a case where the node to which a job is not yet allocated is present. The job management server 50 moves the process to step S165 in a case where the node to which a job is not yet allocated is not present.

[Step S163] In a case where the node to which a job is not yet allocated is present, the job management server 50 allocates the job to the job execution server 600 that has the node ID.

[Step S164] The job management server 50 registers the information of the node to which the job is allocated in the job execution information. The job management server 50 registers information such as the node ID to which the job is allocated, the job ID of the allocated job, and the start time in the job execution information, for example. The job management server 50 moves the process to step S162 after the registration in the job execution information.

[Step S165] Because the job management server 50 allocates jobs to all the node IDs that are registered in the used node ID in the job management table 810, the job management server 50 transmits a job start command to all the nodes. Accordingly, target jobs are together started by the job execution servers 600 to which the jobs are allocated.

The process procedures illustrated in FIGS. 10, 11, and 12 are executed, and the job management server 50 thereby allocates the jobs to the job execution servers 600 based on the job management table 810. The job execution server 600 executes the allocated job and requests a file access to the file system 10. Further, the log data in a case where the job execution server 600 requests the file access to the file system 10 are generated by the metadata server 200 and are accumulated as the access log 820.

In FIG. 10, it is assumed that the power source management process 903 is performed in the metadata server 200 in a case where the resource allocation 902 is performed to the metadata server 200 and the data server 300. This power source management process 903 will be described in (3) Power reduction process.

(3) Power Reduction Process

In the power reduction process, the metadata server 200 estimates accesses to the disks 410 in a prescribed time segment T based on the access tally table 830 and performs the power source management based on estimation results so as to reduce the power consumption.

Figure 13:
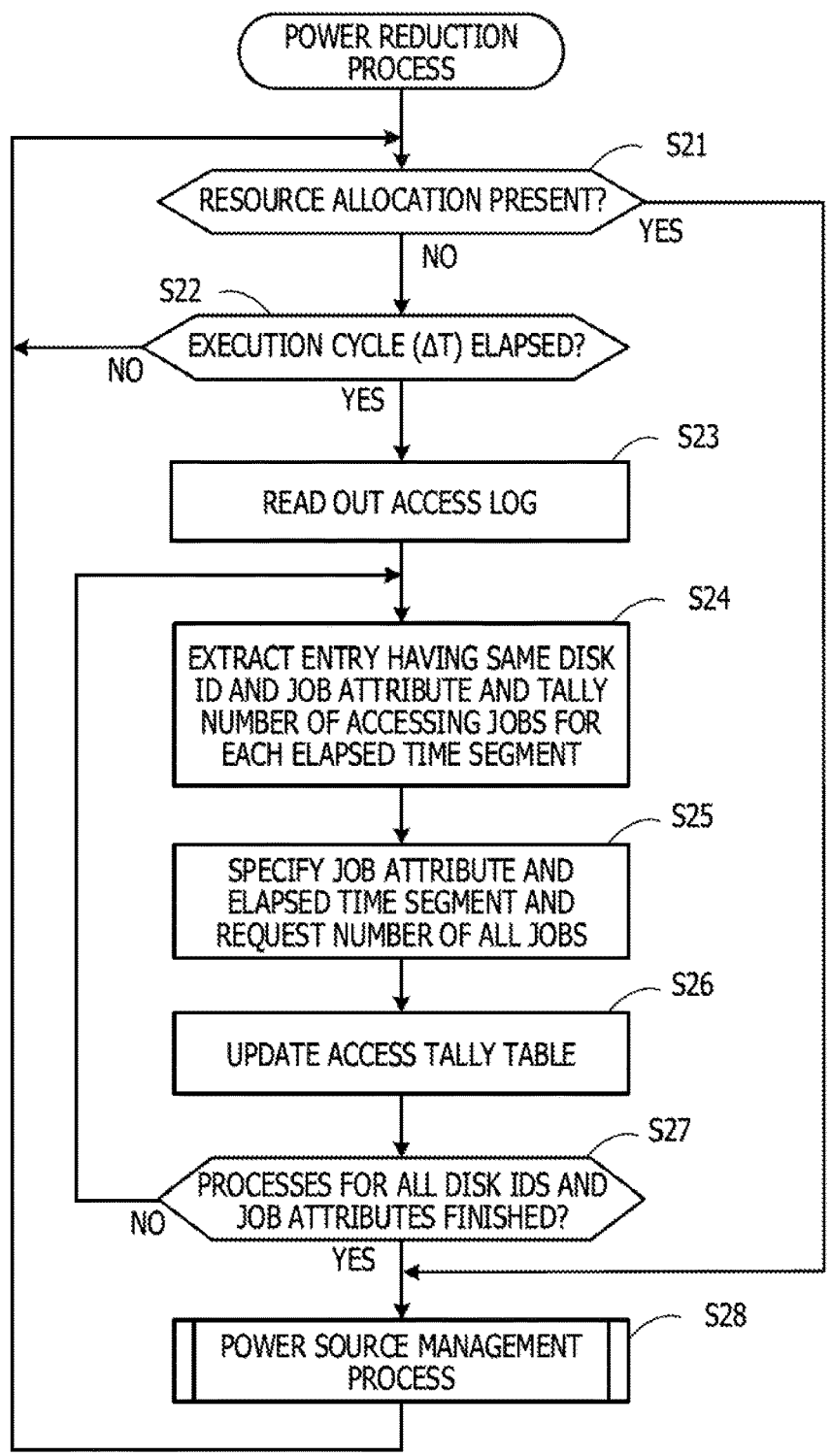
FIG. 13 is a diagram that illustrates a flowchart of a power reduction process of a metadata server in the second embodiment.

The power reduction process will be described with reference to FIG. 13. As described above, the metadata server 200 performs the power source management process for the power reduction also in a case where the metadata server 200 acquires the resource allocation 902. Because the acquisition of the resource allocation 902 indicates addition of a new job that performs an access request to the file system 10, the access pattern from the job execution server 600 changes. Thus, when the resource allocation 902 is acquired, the metadata server 200 performs the power source management process in accordance with the newly executed job and may thereby reduce the power consumption more effectively. The usual power source management process in accordance with the operation situation of a job is performed in a regular cycle of the unit time ($\Delta T$) of the time segments. The time segment that is used as the reference of the power source management process is a time zone, which is obtained by dividing the elapsed time from the starting time of the system by the unit time (ΔT). In the second embodiment, the unit time is common to the unit time that divides the elapsed time of a job. The start time point of the time segments is different between the time segments that are counted from the starting time of the system and the elapsed time segments that are counted from the starting time of the job. However, the timing at which the time segments are switched is the same. For example, at the timing when one is added to the number provided to the time segments that are counted from the starting time of the system, one is added to the number provided to the elapsed time of a job.

A description will next be made about the power reduction process by the metadata server in the second embodiment. FIG. 13 is a diagram that illustrates a flowchart of the power reduction process of the metadata server in the second embodiment.

[Step S21] The metadata server 200 determines whether or not the resource allocation 902 is made. The metadata server 200 moves the process to step S28 in a case where the resource allocation 902 is made. Further, the metadata server 200 moves the process to step S22 in a case where the resource allocation 902 is not made.

[Step S22] The metadata server 200 determines whether or not the present time is in an execution cycle (ΔT) of an access log analyzing process for analyzing the access log 820. The metadata server 200 moves the process to step S23 in a case where the present time is in the execution cycle of the access log analyzing process. Further, the metadata server 200 moves the process to step S21 in a case where the present time is not in the execution cycle of the access log analyzing process.

[Step S23] The metadata server 200 reads out the access log 820 that is stored in the storage unit 220. The metadata server 200 extracts log data, which are sampled after the previous access log analyzing process finishes, from the access log 820, for example.

[Step S24] The metadata server 200 analyzes the access log 820 that is read out, extracts the entry that has the same disk ID and job attribute, and tallies the number of accessing jobs for each of the elapsed time segments. For example, the elapsed time segment in which an access is made is registered in the access log 820a illustrated in FIG. 6, while being associated with the job with the disk ID of [1] and the job attribute of [GID: 2, UID: 5]. In this case, the metadata server 200 adds one to the tally value of the number of accessing jobs, which corresponds to the elapsed time segment 1. In a case where another entry that has the same disk ID and job attribute is present, the same process is performed.

[Step S25] The metadata server 200 specifies the job attribute and the elapsed time segment and requests the number of all jobs that corresponds to the specification from the job management server 50. The metadata server 200 stores the job attribute and elapsed time segment, for which the number of jobs which make accesses is updated, in step S24, for example, specifies the job attribute and the elapsed time segment, and thereby requests the number of all jobs of the jobs having the same job attribute, which are executed in this elapsed time segment, from the job management server 50.

[Step S26] The metadata server 200 adds the tallied number of jobs that make accesses and the number of all jobs that is acquired from the job management server 50 to the number of jobs that make accesses and the number of all jobs, which correspond to the disk ID, the job attribute, and the elapsed time segment in the access tally table 830. Accordingly, the access tally table 830 is updated. As described above, the number of jobs that make accesses and the number of all jobs that are newly tallied are added to the tally values to the previous time, and the cumulative values from the starting time of the system of the number of jobs that make accesses and the number of all jobs with respect to the jobs having this job attribute for each of the elapsed time segments.

[Step S27] The metadata server 200 determines whether or not access tally processes are finished for all the disk IDs and job attributes. The metadata server 200 moves the process to step S28 in a case where the access tally processes are finished. The metadata server 200 moves the process to step S24 in a case where the access tally processes are not finished.

[Step S28] The metadata server 200 executes the power source management process because update of the access tally table 830 is finished. In the power source management process, the power source is managed so as to reduce the power consumption of the storage apparatus 400. The metadata server 200 may delete the entries used for tally processes from the access log 820. The metadata server 200 moves the process to step S21 after the power source management process is finished.

In the above flowchart, whether or not the resource allocation 902 is present is determined in an access analyzing process, and the power source management process is thereby started. However, for example, a power source control instruction process may be started in a reception process of the resource allocation 902.

Figure 14:
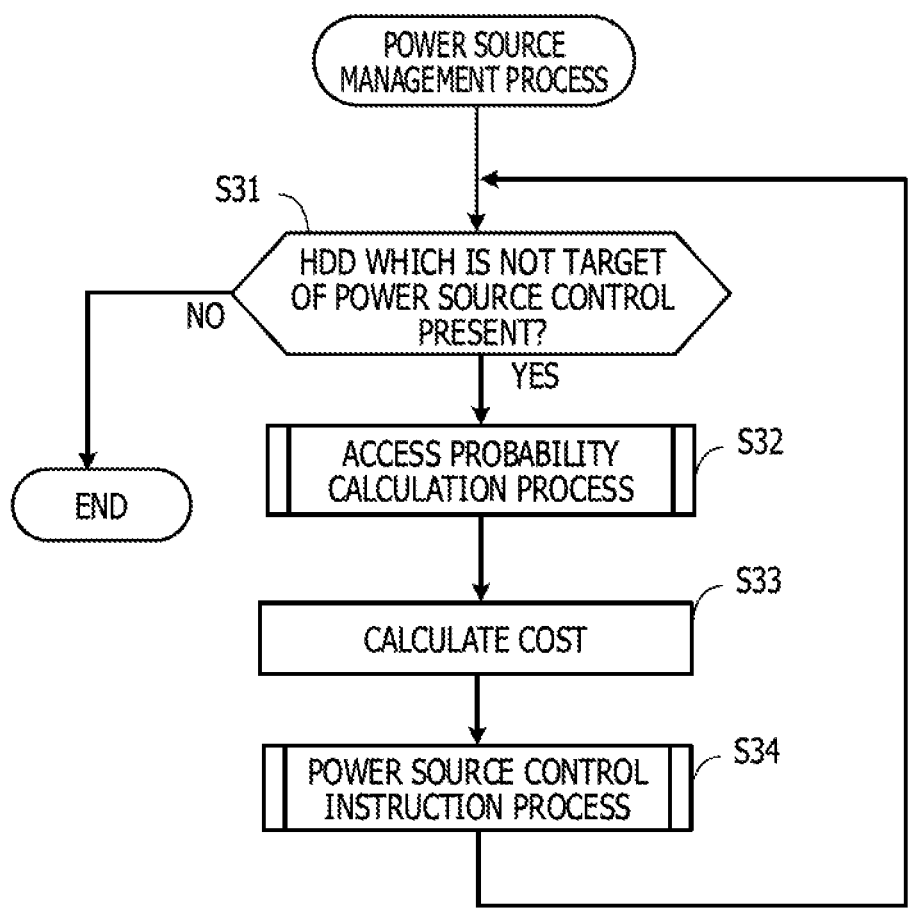
FIG. 14 is a diagram that illustrates a flowchart of a power source management process of the second embodiment.

A description will next be made about the power source control of the second embodiment with reference to FIG. 14. FIG. 14 is a diagram that illustrates a flowchart of the power source management process of the second embodiment. In the power source management process of the second embodiment, the power source management is performed by setting the next time segment to the present time segment as a target time segment.

[Step S31] The metadata server 200 determines whether or not the HDD that does not yet become the target of the power source management in the present power source management process is present. The metadata server 200 moves the process to step S32 in a case where the HDD that does not become the target of the power source management is present. Further, the metadata server 200 finishes the power source management process in a case where the power source management process for all the HDDs is finished and the HDD that does not yet become the target of the power source management is not present.

[Step S32] The metadata server 200 performs an access probability calculation process for calculating the access probability that an HDD (D) is accessed in a target time segment for the HDD (D) that is the target of the power source management. Details of the access probability calculation process will be described later with reference to FIG. 16.

[Step S33] With respect to the HDDs (D) that are the targets of the power source control, the metadata server 200 calculates the costs in cases where the power sources of the HDDs (D) are turned on, where the power sources are turned off, and where the power source states are maintained based on the access probabilities that are calculated in step S32. Details of a cost calculation process will be described later.

[Step S34] The metadata server 200 performs the power source control instruction process for performing control to obtain the power source states where the power consumption of the HDDs (D) may be reduced most based on the costs calculated in step S33. Details of the power source control instruction process will be described later with reference to FIG. 17.

The above-described process procedure is executed. Accordingly, the metadata server 200 estimates the access probabilities of the disks 410, determines the power source states where the power consumption amount is reduced most based on the access probabilities, and thus may effectively reduce the power consumption amount.

Figure 15:
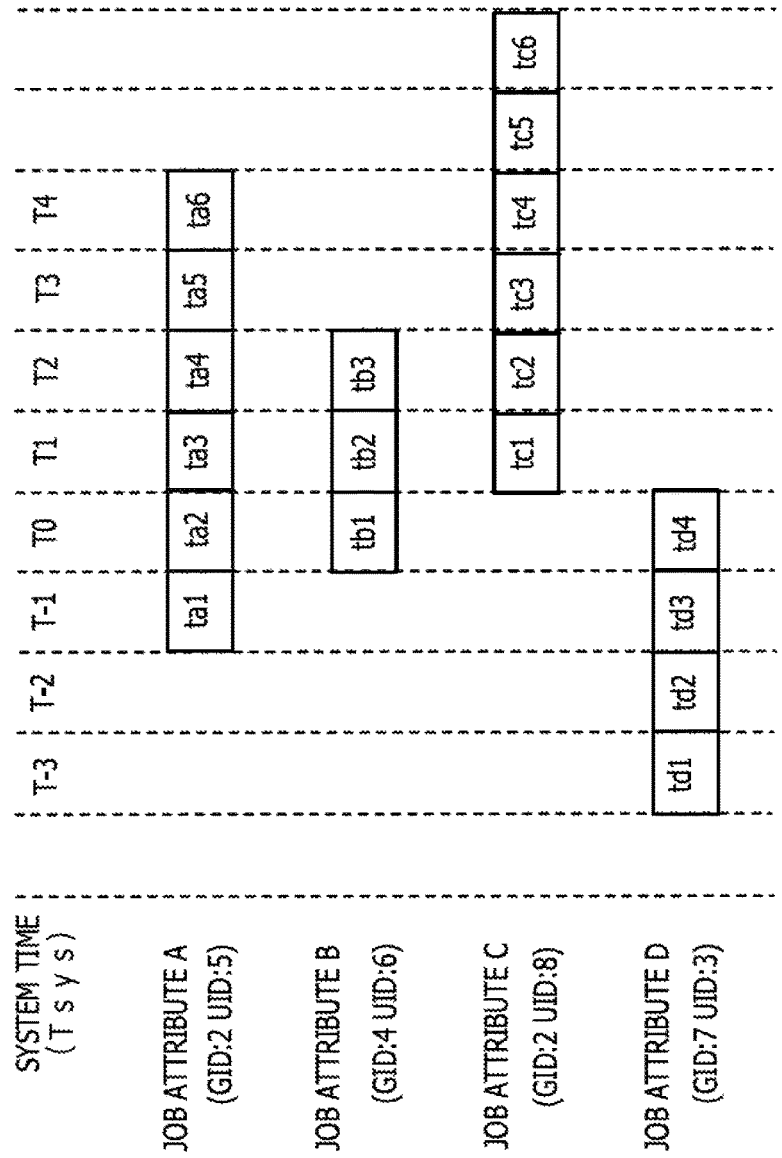
FIG. 15 is a diagram that explains an access estimation process of the second embodiment.

A description will next be made about the access probability calculation process of the second embodiment will be described. An access estimation process will first be described with reference to FIG. 15. FIG. 15 is a diagram that explains the access estimation process of the second embodiment.

The system time (Tsys) is the time in which whole the system is synchronized. The dotted lines illustrated in FIG. 15 are divisions for the time segments and are the lines that divide the elapsed time segments by the unit time ($\Delta T$). The present time segment is expressed as T0, the next time segment is expressed as T1, and the time segments are respectively expressed as T2, T3, T4, . . . . Meanwhile, as for the past time segments earlier than T0, the previous time segment is expressed as T-1, and the further previous time segments are respectively expressed as T-2, T-3, . . . . Here, in the second embodiment, it is assumed that, in the access estimation process for the power source control, the next time segment T1 is set as the target time segment, and the power source control is performed by estimating accesses by jobs in the target time segment T1.

Job attribute A, job attribute B, job attribute C, and job attribute D are jobs that are executed by the job execution server 600 and have respective different job attributes. Further, the job of each of the job attributes has been executed one or more times before T-3, and log data for each of the elapsed time segments are registered in the access log 820. When the jobs are executed by the job execution server 600, the metadata server 200 generates the log data when the job execution server 600 accesses the file system 10 and accumulates the log data in the access log 820. Further, the metadata server 200 generates the access tally table 830 in which the access log 820 is tallied and stores the access tally table 830 in the storage unit 220.

A description will be made about the job that is executed in a close point to the target time segment T1 in which the access estimation is performed. The job having the job attribute A is executed between the time segments T-1 to T4 of the system time. ta1, ta2, ta3, ta4, ta5, and ta6 indicate the elapsed time segments after the job having the job attribute A is started. For example, ta1 is the first elapsed time segment after the job having the job attribute A is started. The same applies to the job attribute B, the job attribute C, and the job attribute D. The metadata server 200 detects the job that is planned to be executed in the target time segment T1 and the elapsed time segment of the job based on the job management table 810. In the example of FIG. 13, the job having the job attribute A is planned to be executed in the target time segment T1, and the elapsed time segment of the job is ta3. The job having the job attribute B is planned to be executed in the target time segment T1, and the elapsed time segment of the job is tb2. The job having the job attribute C is planned to be executed in the target time segment T1, and the elapsed time segment of the job is tc1. The job having the job attribute D has been finished at the target time segment T1 and is not a target.

The metadata server 200 identifies the job that is planned to be executed in the target time segment T1 and the elapsed time segment of the job, which are detected as described above, and estimates accesses to prescribed disks 410 in a prescribed time segment T1 based on the access tally table 830.

The metadata server 200 stochastically infers a matter to be estimated from observed events that are registered in the access tally table 830 (the occurrence of an access to a prescribed disk 410 in the focused target time segment T1). In the second embodiment, Bayesian inference is used as such a stochastic inference method. For example, the metadata server 200 performs the access estimation by using the access probability that the job having the job attribute planned to be executed in the target time segment T1 accesses the target disk 410 as a posterior probability. The metadata server 200 acquires the information of the job that has been executed in the past in the same conditions (in which the target disk 410, the job attribute, and the elapsed time segment match) from the access tally table 830a and calculates the access ratio of the number of jobs that perform accesses to the number of executed jobs. That is, the metadata server 200 estimates the access probability based on the access ratio that is calculated from the observation results based on the access tally table 830a. In one example, the metadata server 200 sets jk as the job attribute, D as the target HDD, and tk as the elapsed time segment of the job and obtains the access probability P(jk, D, tk) by the following equation (2). Given that the number of all jobs is set as n, k is an integer of 1≤k≤n. Given that the number of all HDDs is m, D is an integer of 1≤D≤m.

$$P(jk,D,tk)=N\_accessed(jk,D,tk)\div N\_total(jk,D,tk) \quad (2)$$

N_accessed(jk, D, tk) may be acquired from "number of accessing jobs" in the elapsed time segment tk for the job attribute jk for the disk ID of HDD (D) in the access tally table 830. N_total(jk, D, tk) may be acquired from "number of all jobs" that corresponds to "number of accessing jobs".

A description will be made with specific examples. The metadata server 200 searches the access tally table 830 based on the identified job that is planned to be executed and the elapsed time segment of the job. For example, in a case where the target disk ID is [1], a situation in which the job having the job attribute A performs a process of the elapsed time segment ta3 in the target time segment T1 is registered in the access tally table 830a. The metadata server 200 reads out the information about the elapsed time segment ta3 from the access tally table 830a and acquires the number of accessing jobs of [4] and the number of all jobs of [40]. The extracted numbers of accessing jobs and all jobs are applied to the equation (2), and P(A, 1, 3)=4/40 is thereby obtained. The components of (A, 1, 3) respectively represent jk=the job attribute A, D=the disk ID1, and the elapsed time segment=ta3 in P(jk, D, tk).

Similarly, the access probabilities that the other jobs having the job attributes B and C which access the disk [1] in the target time segment T1 access the disk [1] in the target time segment T1 are calculated. For example, because the elapsed time segment in the target time segment T1 is tb2 for the job attribute B, the access probability is P(B, 1, 2)=2/35 based on the equation (2) and the access tally table 830a. Because the elapsed time segment in the target time segment T1 is tc1 for the job attribute C, the access probability is P(C, 1, 1)=4/20 based on the equation (2) and the access tally table 830a.

As described above, the access probability of an individual job is calculated with respect to all the jobs that are planned to be executed in the target time segment T1. Given that all the accesses to the HDD (D) are independent from each other among jobs, an access probability P(D) that all the jobs access the HDD (D) in a target time segment T may be obtained by the following equation.

$$P(D)=1-\Pi(1-p(jk,D,tk)) \quad (3)$$

As described above, the accesses are estimated based on the access tally table 830a that tallies the access logs 820a of the respective jobs which are planned to be executed in the target time segment T1, and the accuracy of the access estimation may thus be increased. Further, the power source control is performed based on the highly accurate access estimation, and the power consumption amount may thereby be reduced more certainly.

Figure 16:
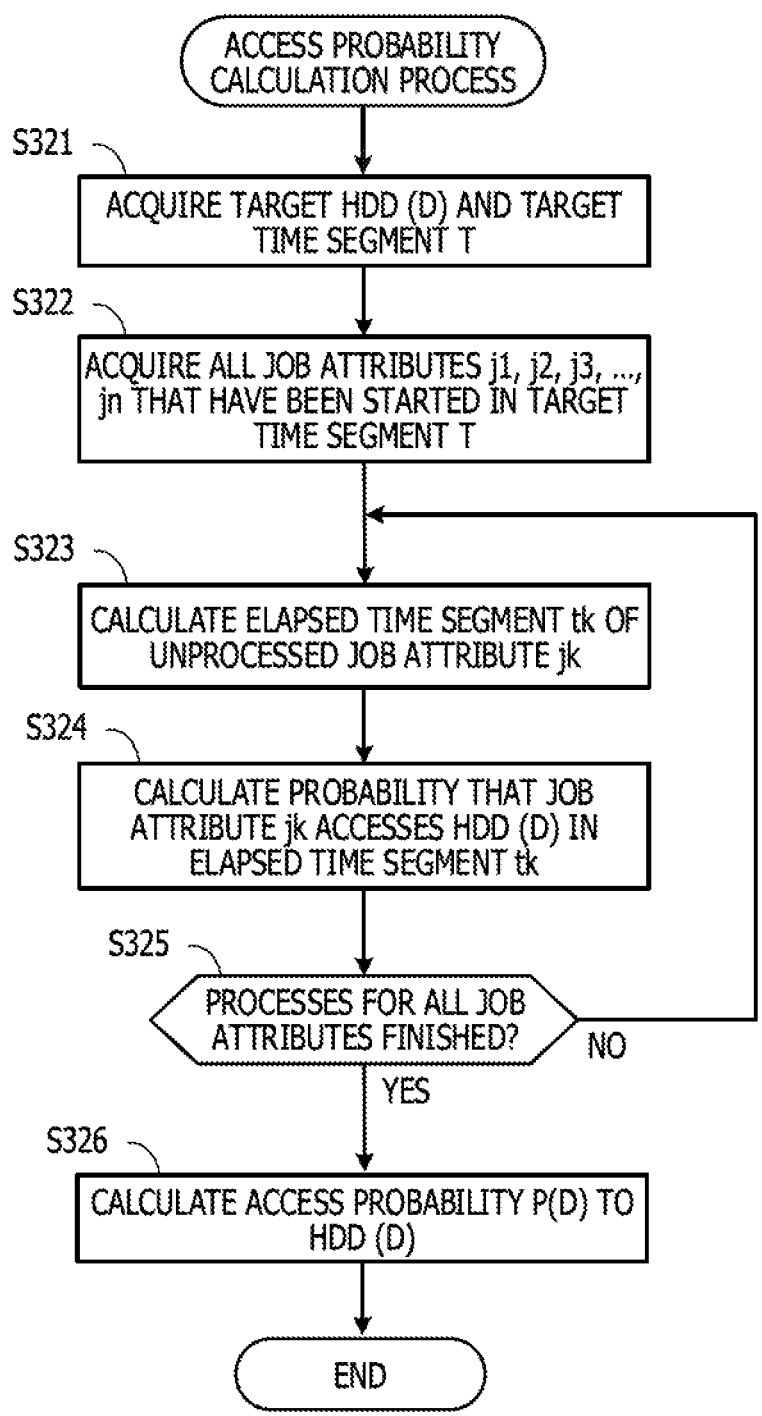
FIG. 16 is a diagram that illustrates a flowchart of an access probability calculation process of the second embodiment.

A description will next be made about procedures of the access probability calculation process for calculating the above access probabilities. FIG. 16 is a diagram that illustrates a flowchart of the access probability calculation process of the second embodiment. In the description made below, it is assumed that a target HDD is the HDD (D), a target time segment is T, and all job attributes that have been started in the target time segment T are j1, j2, . . . , jn.

[Step S321] The metadata server 200 acquires the HDD (D) as the target of cost calculation and the target time segment T.

[Step S322] The metadata server 200 specifies the target time segment T and thereby requests the information about all the job attributes j1, j2, . . . , jn that have been started in the target time segment T from the job management server 50. The job management server 50 extracts all the job attributes j1, j2, . . . , jn that are planned to be executed in the target time segment T based on the job management table 810 and transmits all the job attributes j1, j2, . . . , jn to the metadata server 200. The jobs that are planned to be executed include the jobs that have been started and being executed and the jobs that are started in the next time segment.

[Step S323] The metadata server 200 extracts an unprocessed job attribute jk from the job attributes acquired from the job management server 50 and calculates the elapsed time segment tk of the job attribute jk in the target time segment T.

[Step S324] The metadata server 200 searches the access tally table 830 and extracts the number of accessing jobs and the number of all jobs that correspond to the elapsed time segment tk of the job attribute jk. The metadata server 200 calculates the access ratio of the accesses to the HDD (D) in the elapsed time segment tk based on the extracted numbers of accessing jobs and all jobs. The metadata server 200 calculates the access probability P(jk, D, tk) of the accesses to the HDD (D) by the job of the job attribute jk in the target time segment T by using the equation (2) and based on the calculated access ratio.

[Step S325] The metadata server 200 determines whether or not processes for all the job attributes are finished. The metadata server 200 moves the process to step S326 in a case where the processes for all the job attributes are finished but moves the process to step S323 in a case where the processes for all the job attributes are not finished.

[Step S326] Because the metadata server 200 calculates the access probability of the accesses to the HDD (D) by each of the jobs that are planned to be executed in the target time segment T, the metadata server 200 calculates the access probability P(D) of the accesses to the HDD (D) in the target time segment T by using the equation (3).

The above process procedures are executed, and the access probability of the accesses to the HDD (D) by the job that is planned to be executed in the target time segment T may thereby be obtained based on the access tally table 830.

The cost calculation process will next be described.

In the cost calculation process, the cost in accordance with the access probability estimated by the above access estimation that accesses are made to a prescribed disk HDD (D) in the target time segment T is calculated.

The cost in a case where the power source control is performed is calculated based on the access probability P(D) of accesses to the target HDD (D) in the target time segment T. In the second embodiment, the power consumption amount in a case where the power source control is performed is calculated as an index of cost. Here, the power consumption amount will be discussed on an assumption that the case where the power source of the target HDD (D) is turned on at the start time point of the target time segment T and is kept turned on during the interval of the target time segment T is set as a reference. Because the reduction in the power consumption amount by the power source control does not occur, a cost C0(D) in the case where the power source of the HDD (D) is turned on and is kept turned on may be obtained by the following equation (4).

$$C0(D)=0 \quad (4)$$

On the other hand, in a case where the power source is turned off, the power consumption amount that is consumed by the HDD (D) may be reduced in the interval ($\Delta T$) of the target time segment T. Given that the power consumption amount of the disk per unit time is Wd, the expected value of the power consumption amount by turning off the HDD (D) may be expressed as $(-Wd) \times \Delta T \times (1-P(D))$. However, an access from the job execution server 600 occurs at the access probability P(D) while the HDD (D) is turned off. In a case where an access occurs, the power source of the HDD (D) is turned on, and whole the system becomes a waiting state until an access to the HDD (D) becomes feasible. For example, a starting time until an access becomes feasible in a case where an access to the HDD (D) whose power source is turned off occurs is set as Tinc, and the power consumption amount of whole the system per unit time is set as Ws. In this case, the expected value of the power consumption amount that is desired in a case where an access occurs while the power source of the HDD (D) is turned off may be expressed as $(Tinc \times Ws) \times P(D)$. Accordingly, a cost C1(D) in accordance with the power consumption amount in a case where the power source is turned off is the total of the expected value of the power consumption amount that may be reduced by turning off the power source of the HDD (D) and the expected value of the power consumption amount that is desired in a case where an access occurs while the power source is turned off. The cost C1(D) may be calculated by the following equation (5).

$$C1(D)=(Tinc \times Ws) \times P(D)+(-Wd) \times \Delta T \times (1-P(D)) \quad (5)$$

The metadata server 200 calculates the cost C0(D) in a case where the power source of the HDD (D) is turned on and the power source is kept turned on in the target time segment T and the cost C1(D) in a case where the power source is turned off, as described above. The metadata server 200 compares the calculated cost C0(D) with the cost C1(D) and may thereby select the lower cost. For example, the metadata server 200 may provide a power source control instruction as follows:

The power source of the HDD (D) is kept turned on if C1(D)>C0(D).

The power source of the HDD (D) is turned off if C1(D)<C0(D).

Further, the cost may similarly be calculated in a case where the power source of the target HDD (D) is turned off at the start time point of the target time segment T. Similarly to the case where the power source of the HDD (D) is switched from on to off, a cost C2(D) in a case where the power source of the HDD (D) is kept turned off may be calculated by the following equation (6).

$$C2(D)=(Tinc \times Ws) \times P(D)+(-Wd) \times \Delta T \times (1-P(D)) \quad (6)$$

Meanwhile, a cost C3(D) in a case where the power source is switched from off to on may be calculated by the following equation (7).

$$C3(D)=(-Wd) \times \Delta T \times P(D) \quad (7)$$

The metadata server 200 calculates the cost C2(D) in a case where the power source of the HDD (D) is turned off and the power source is kept turned off in the target time segment T and the cost C3(D) in a case where the power source is turned on, as described above. The metadata server 200 compares the calculated cost C2(D) with the cost C3(D) and may thereby select the lower cost. For example, the metadata server 200 may provide a power source control instruction as follows:

The power source of the HDD (D) is kept turned off if C3(D)>C2(D).

The power source of the HDD (D) is turned on if C3(D)<C2(D).

The metadata server 200 calculates the cost for each of the cases where the power source control of the HDD (D) is performed based on the access probabilities and performs the power source control so that the cost becomes lower based on the calculated costs.

Figure 17:
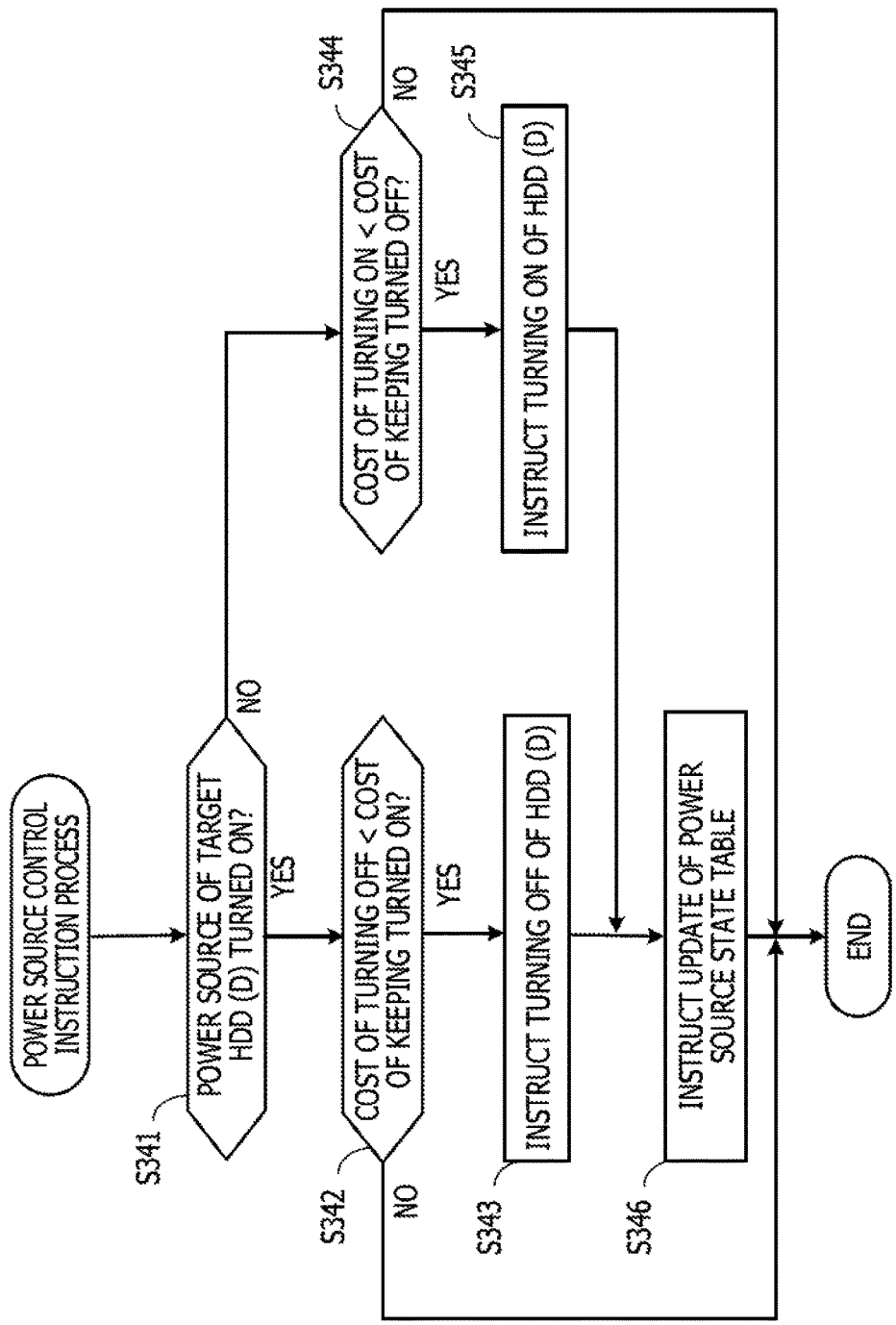
FIG. 17 is a diagram that illustrates a flowchart of a power source control instruction process of the second embodiment.

The power source control instruction process will next be described with reference to FIG. 17. FIG. 17 is a diagram that illustrates a flowchart of the power source control instruction process of the second embodiment. The processes placed in ( ) in the flowchart described below indicate the processes by the data server 300 that receives instructions from the metadata server 200.

[Step S341] The metadata server 200 acquires the power source state table 840 from the data server 300. The metadata server 200 determines whether or not the power source of the target HDD (D) is turned on based on the acquired power source state table 840. The metadata server 200 moves the process to step S342 in a case where the power source of the target HDD (D) is turned on but moves the process to step S344 in a case where the power source is not turned on.

[Step S342] The metadata server 200 compares the cost C1(D) in a case where the power source of the target HDD (D) is turned off with the cost C0(D) in a case where the power source is kept turned on. The metadata server 200 moves the process to step S343 in a case where the comparison result is the cost C1(D) in the case of tuning off < the cost C0(D) in the case of keeping turned on. The metadata server 200 finishes the process without changing the power source state in a case where the comparison result is not the cost C1(D) in the case of tuning off < the cost C0(D) in the case of keeping turned on.

[Step S343] The metadata server 200 instructs the data server 300 to turn off the power source of the target HDD (D) and moves the process to step S346. (The data server 300 that receives the instruction controls the power source 420 and stops the power source supply to the target HDD (D).)

[Step S344] The metadata server 200 compares the cost C3(D) in a case where the power source of the target HDD (D) is turned on with the cost C2(D) in a case where the power source is kept turned off. The metadata server 200 moves the process to step S345 in a case where the comparison result is the cost C3(D) in the case of tuning on < the cost C2(D) in the case of keeping turned off. The metadata server 200 finishes the process without changing the power source state in a case where the comparison result is not the cost C3(D) in the case of tuning on < the cost C2(D) in the case of keeping turned off.

[Step S345] The metadata server 200 instructs the data server 300 to turn on the power source of the target HDD (D) and moves the process to step S346. (The data server 300 that receives the instruction controls the power source 420 and starts the power source supply to the target HDD (D).)

[Step S346] The metadata server 200 instructs the data server 300 to cause the power source state table 840 to reflect turning off of the power source of the target HDD (D) and thereby update the power source state table 840 and finishes the process. (The data server 300 that receives the instruction updates the power source state table 840.)

The above-described process procedures are executed. Accordingly, the metadata server 200 estimates the access probability of accesses to each of the HDDs (D) and performs the power source control of the HDD (D) based on the cost calculated from the estimated access probability.

As described above, the metadata server 200 calculates the access probability of accesses from jobs to the target HDD (D) in a prescribed time segment based on the access history that reflects the access patterns which differ among jobs. The metadata server 200 performs the power source control so that the cost that corresponds to the power consumption amount becomes lowest based on the calculated access probabilities. This enables the power consumption of the storage apparatus to be reduced further effectively compared to the power source control that does not take the access patterns into consideration.

The above process functions may be realized by a computer. In such a case, programs that describe the process contents of the functions that the storage control apparatus has to have are provided. The programs are executed by the computer, and the above process functions are thereby realized in the computer. The programs that describe the process contents may be recorded in a computer-readable recording medium. Examples of the computer-readable recording media may include magnetic storage apparatuses, optical disks, magneto-optical recording media, semiconductor memories, and so forth. Examples of the magnetic storage apparatuses may include hard disk apparatuses (HDD), flexible disks (FD), magnetic tapes, and so forth. Examples of the optical disks may include DVD, DVD-RAM, CD-ROM/RW, and so forth. Examples of the magneto-optical recording media may include magneto-optical disks (MO) and so forth.

In a case where the programs are distributed, portable recording media, such as the DVDs and CD-ROMs, in which the programs are recorded are sold, for example. Further, the programs are stored in a storage apparatus of a server computer, and the programs may thereby be transferred from the server computer to other computers via a network.

A computer that executes the programs stores the programs recorded in the portable recording medium or the programs transferred from the server computer in a storage apparatus of the computer. The computer then reads the programs from the storage apparatus of the computer and executes processes in accordance with the programs. The computer may read the programs directly from the portable recording medium and execute processes in accordance with the programs. Further, the computer may sequentially execute processes in accordance with the received programs at each time when the programs are transferred from the server computer coupled therewith via the network.

Further, at least a portion of the above process functions may be realized by electronic circuits such as a digital signal processor (DSP), an application specific integrated circuit (ASIC), and a programmable logic device (PLD).

The techniques of the present disclosure are not limited to the above embodiments as themselves but may be embodied by modifying the configuration elements in phases of practice within the scope that does not depart from the gist of the present disclosure. Further, various embodiments may be formed by appropriately combining the plural configuration elements that are disclosed in the above embodiments. For example, all the configuration elements that are described in the above embodiments may appropriately be combined. In addition, the configuration elements across the different embodiments may appropriately be combined. The above-described various modifications and applications within the scope that does not depart from the gist of the present disclosure are possible.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage control apparatus configured to control a storage device accessed by an information processing apparatus when the information processing apparatus executes a job, the storage control apparatus comprising:
   a memory configured to store plan information that indicates when the information processing apparatus will execute a job in a future, and history information, the history information being configured to store a plurality of access histories each of which stores a job identifier identifying a job that has issued an access request to a storage device, and a device identifier identifying a storage device accessed in response to the access request, in association with a time segment in which the storage device has been accessed in response to the access request, the time segment being one of a sequence of time zones each having a fixed length of time and corresponding to an elapsed time from a start of the job; and
   a processor coupled to the memory and configured to:
      upon receiving an access request that has been issued by a job to a storage device, perform an access control process; including:
      accessing the storage device,
      generating an access history that stores the job identifier identifying the job and the device identifier identifying the storage device in association with a time segment in which the storage device has been accessed, and
      accumulating the generated access history in the history information; and
      for a first time segment and a first storage device, perform a power source control process including:
         determining, based on the plan information and the access histories accumulated in the history information, an access probability that the information processing apparatus will access the first storage device in the first time segment when the information processing apparatus executes each of jobs that are scheduled to be executed in the first time segment,
         making, based on the access probabilities determined for the respective jobs, a prediction of whether the information processing apparatus will access the first storage device in the first time segment, and
         controlling a power supply to the first storage device based on the prediction.

2. The storage control apparatus according to claim 1, wherein
   the history information includes a first access history about a job of which execution is started at a first start time and a second access history about a job of which execution is started at a second start time, and
   determination of the access probability is executed based on the first access history and the second access history.

3. The storage control apparatus according to claim 2, wherein
   the processor is further configured to determine a first power consumption amount that is reduced in a case where the power supply to the first storage device is not performed in the first time segment and a second power consumption amount that is consumed in a period between a first time when the first storage device becomes usable and a second time when an access to the first storage device occurs in a state that the power supply to the first storage device is not performed, and
   control of the power supply to the first storage device is executed based on comparison of the first power consumption amount and the second power consumption amount.

4. A method of controlling a storage apparatus, the storage apparatus being configured to be accessed by an information processing apparatus when the information processing apparatus executes a job, the method comprising:
   obtaining plan information that indicates when the information processing apparatus will execute a job in a future;
   obtaining history information that is configured to store a plurality of access histories each of which stores a job identifier identifying a job that has issued an access request to a storage device, and a device identifier identifying a storage device accessed in response to the access request, in association with a time segment in which the storage device has been accessed in response to the access request, the time segment being one of a sequence of time zones each having a fixed length of time and corresponding to an elapsed time from a start of the job;
   upon receiving an access request that has been issued by a job to a storage device, performing an access control process; including:
   accessing the storage device,
   generating an access history that stores the job identifier identifying the job and the device identifier identifying the storage device in association with a time segment in which the storage device has been accessed, and accumulating the generated access history in the history information; and for a first time segment and a first storage device, performing a power source control process including:

determining, based on the plan information and the access histories accumulated in the history information, an access probability that the information processing apparatus will access the first storage device in the first time segment when the information processing apparatus executes each of jobs that are scheduled to be executed in the first time segment, making, based on the access probabilities determined for the respective jobs, a prediction of whether the information processing apparatus will access the first storage device in the first time segment, and controlling a power supply to the first storage device, based on the prediction.

5. The method according to claim 4, wherein the history information includes a first access history about a job of which execution is started at a first start time and a second access history about a job of which execution is started at a second start time, and the determining of the access probability is executed based on the first access history and the second access history.

6. The method according to claim 5 further comprising:

determining a first power consumption amount that is reduced in a case where the power supply to the first storage device is not performed in the first time segment;

determining a second power consumption amount that is consumed in a period between a first time when the first storage device becomes usable and a second time when an access to the first storage device occurs in a state that the power supply to the first storage device is not performed; and comparing the first power consumption amount and the second power consumption amount, wherein the controlling of the power supply to the first storage device is executed based on a result of the comparing.

* * * * *